United States Patent
Simionescu et al.

(10) Patent No.: US 10,282,116 B2
(45) Date of Patent: May 7, 2019

(54) METHOD AND SYSTEM FOR HARDWARE ACCELERATED CACHE FLUSH

(71) Applicant: Avago Technologies International Sales Pte. Limited, Singapore (SG)

(72) Inventors: Horia Simionescu, Foster City, CA (US); Timothy Hoglund, Colorado Springs, CO (US); Sridhar Rao Veerla, Bangalore (IN); Panthini Pandit, Bangalore (IN); Gowrisankar Radhakrishnan, Colorado Springs, CO (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 15/654,361

(22) Filed: Jul. 19, 2017

(65) Prior Publication Data

US 2019/0026033 A1    Jan. 24, 2019

(51) Int. Cl.
| | |
|---|---|
| *G06F 12/00* | (2006.01) |
| *G06F 3/06* | (2006.01) |
| *G06F 12/128* | (2016.01) |
| *G06F 12/0831* | (2016.01) |
| G06F 13/00 | (2006.01) |
| G06F 13/28 | (2006.01) |

(52) U.S. Cl.
CPC .......... *G06F 3/0619* (2013.01); *G06F 3/0659* (2013.01); *G06F 3/0665* (2013.01); *G06F 3/0689* (2013.01); *G06F 12/0831* (2013.01); *G06F 12/128* (2013.01); *G06F 2212/621* (2013.01)

(58) Field of Classification Search
CPC .... G06F 3/0619; G06F 12/128; G06F 3/0659; G06F 3/0665; G06F 3/0689; G06F 12/0831; G06F 2212/621
See application file for complete search history.

(56) References Cited

U.S. PATENT DOCUMENTS

| | | | |
|---|---|---|---|
| 8,495,301 | B1 | 7/2013 | Alexander et al. |
| 9,317,436 | B2* | 4/2016 | Pan ...................... G06F 12/0871 |
| 9,396,067 | B1* | 7/2016 | Subramanian ...... G06F 11/1088 |
| 2004/0117441 | A1* | 6/2004 | Liu ...................... G06F 12/0888 |
| | | | 709/203 |
| 2008/0005464 | A1* | 1/2008 | Lubbers .............. G06F 12/0804 |
| | | | 711/113 |
| 2013/0254457 | A1 | 9/2013 | Mukker et al. |
| 2014/0281131 | A1 | 9/2014 | Joshi et al. |
| 2018/0113634 | A1* | 4/2018 | Simionescu .......... G06F 3/0631 |

* cited by examiner

*Primary Examiner* — Mark A Giardino, Jr.
(74) *Attorney, Agent, or Firm* — Sheridan Ross P.C.

(57) ABSTRACT

A system and method for efficient cache flushing are provided. The disclosed method includes allocating one or more Internal Scatter Gather Lists (ISGLs) for the cache flush, populating the one or more ISGLs with Cache Segment Identifiers (CSIDs) and corresponding Buffer Segment Identifiers (BSIDs) of each strip that is identified as dirty, of a skip-type Internal Scatter Gather Element (ISGE), or of a missing arm-type ISGE. The disclosed method further includes allocating a flush Local Message Identifier (LMID) as a message to be used in connection with processing the cache flush, populating the flush LMID with an identifier of the one or more ISGLs, and transferring the flush LMID to a cache manager module to enable the cache manager module to execute the cache flush based on information contained in the flush LMID.

20 Claims, 27 Drawing Sheets

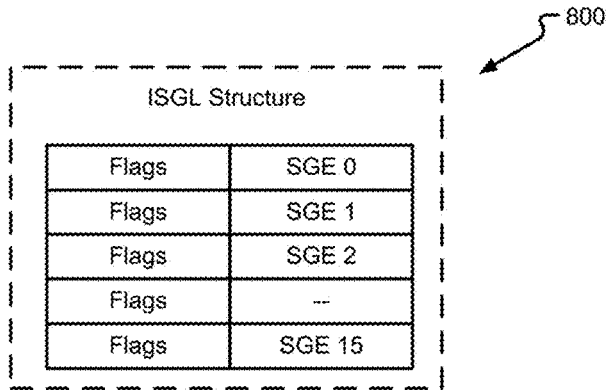

ISGL Structure

| Flags | SGE 0 |
|---|---|
| Flags | SGE 1 |
| Flags | SGE 2 |
| Flags | -- |
| Flags | SGE 15 |

*Fig. 8A*

| SGE Descriptor | SGE Flag | SGE ID |
|---|---|---|
| Terminator | 0x00 | INVALID ID |
| Dirty Buffer Segment | 0x10 | BSID |
| Non-Dirty Buffer Segment | 0x20 | BSID |
| Inner Filler Buffer Segment | 0x40-0x7F | BSID |
| Outer Filler Buffer Segment | 0x80-0xBF | BSID |
| Cache Segment | 0xC0 | CSID |
| Write In Progress CS | 0xC1 | CSID |
| Unmap In Progress CS | 0xC2 | CSID |
| Missing Arms Count | 0xF0 | Count (1 to 31) |
| Missing Buffers Count | 0xF1 | Count (1 to 255) |
| Linked ISGL | 0xFF | ISGL ID |

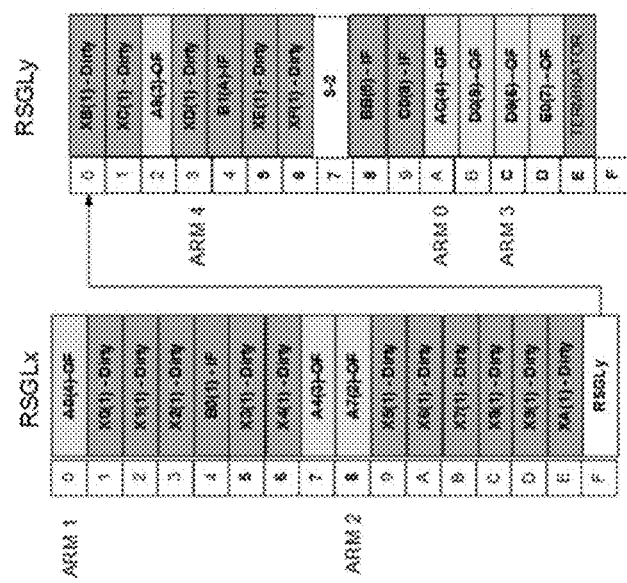
Fig. 22C
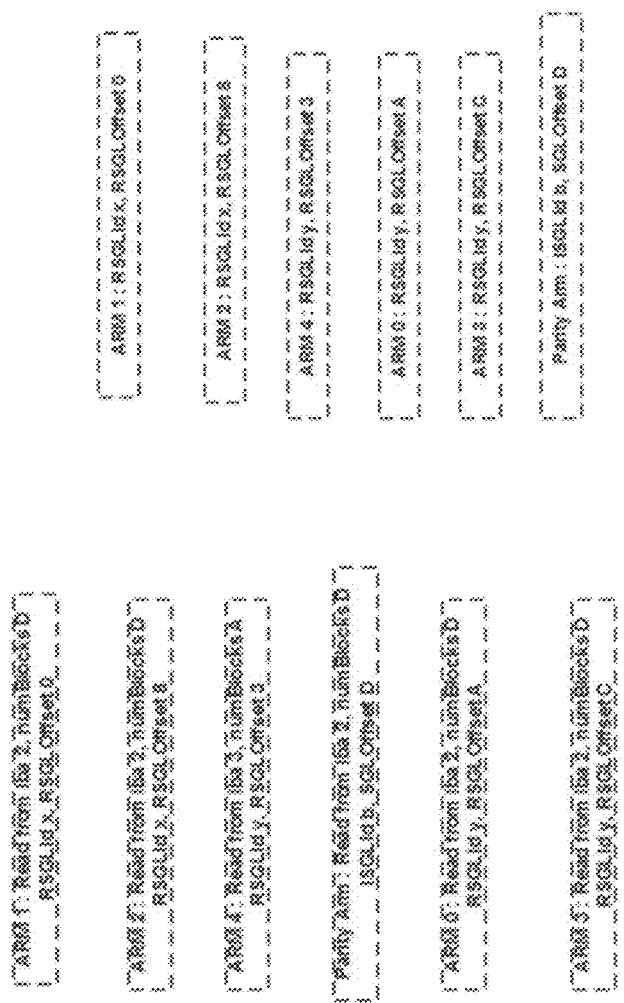
Fig. 22B
Fig. 22A

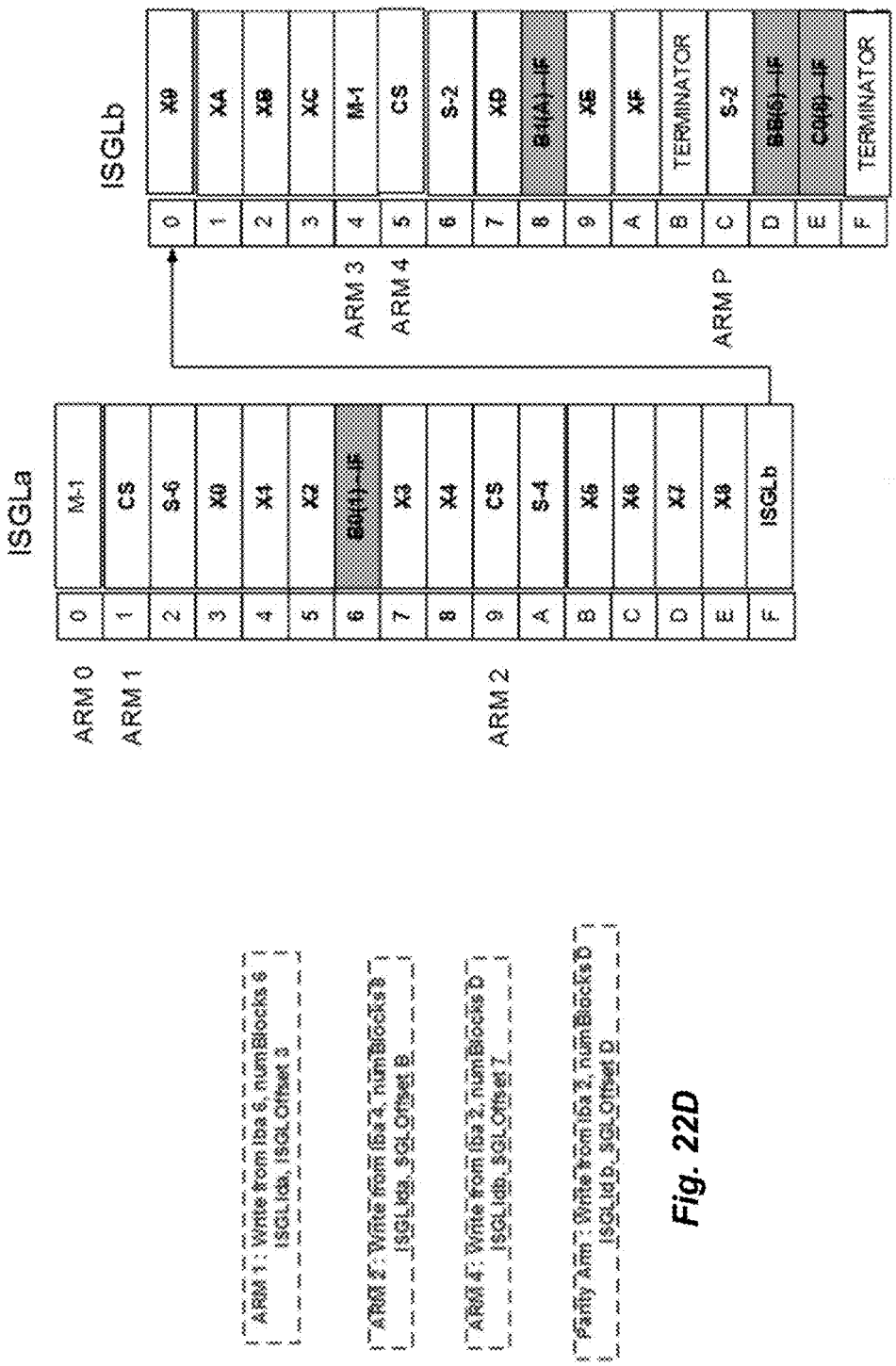

METHOD AND SYSTEM FOR HARDWARE ACCELERATED CACHE FLUSH

FIELD OF THE DISCLOSURE

The present disclosure is generally directed toward computer memory.

BACKGROUND

Traditional caching processes in MegaRAID inherently require region locks to avoid data inconsistency. This is especially for RAID 5 and RAID 6 architectures. Unlike RAID 0 and RAID 1, RAID 5/6 architectures have one or two parity arms for redundancy. Flush algorithms need to make sure that the parity data is always consistent. Each update for the data arms would result in an update for the parity. That means that either one needs to read all the remaining drives to calculate a new parity (e.g., a so-called read peers method) or the old data for the dirty arms and parity arms needs to be read to perform an XOR to calculate the new parity (e.g., a so-called read-modify-write). This means that the same processes used for RAID 0/1 architectures cannot be used for other architectures that make use of parity arms for redundancy.

BRIEF DESCRIPTION OF THE DRAWINGS

The present disclosure is described in conjunction with the appended figures, which are not necessarily drawn to scale:

FIG. 8A is a block diagram depicting details of a first portion of a sixth data structure in accordance with at least some embodiments of the present disclosure;

FIG. 8B is a block diagram depicting details of a second portion of the sixth data structure in accordance with at least some embodiments of the present disclosure;

FIG. 21 is a block diagram depicting a flush LMID after allocation in accordance with embodiments of the present disclosure;

FIG. 22A is a block diagram depicting a phase for read peers where a read command is issued with a read filler option in accordance with embodiments of the present disclosure;

FIG. 22B is a block diagram depicting a phase for read peers where an XOR is used with a do not skip filler option in accordance with embodiments of the present disclosure;

FIG. 22C is a block diagram depicting a phase for read peers where outer buffers and RSGLs are freed in accordance with embodiments of the present disclosure;

FIG. 22D is a block diagram depicting a phase for read peers where a write is issued from an ISGL in accordance with embodiments of the present disclosure; and FIG. 22E is a block diagram depicting a phase for read peers where buffers are freed and a cache update is completed in accordance with embodiments of the present disclosure.

DETAILED DESCRIPTION

Figure 1:
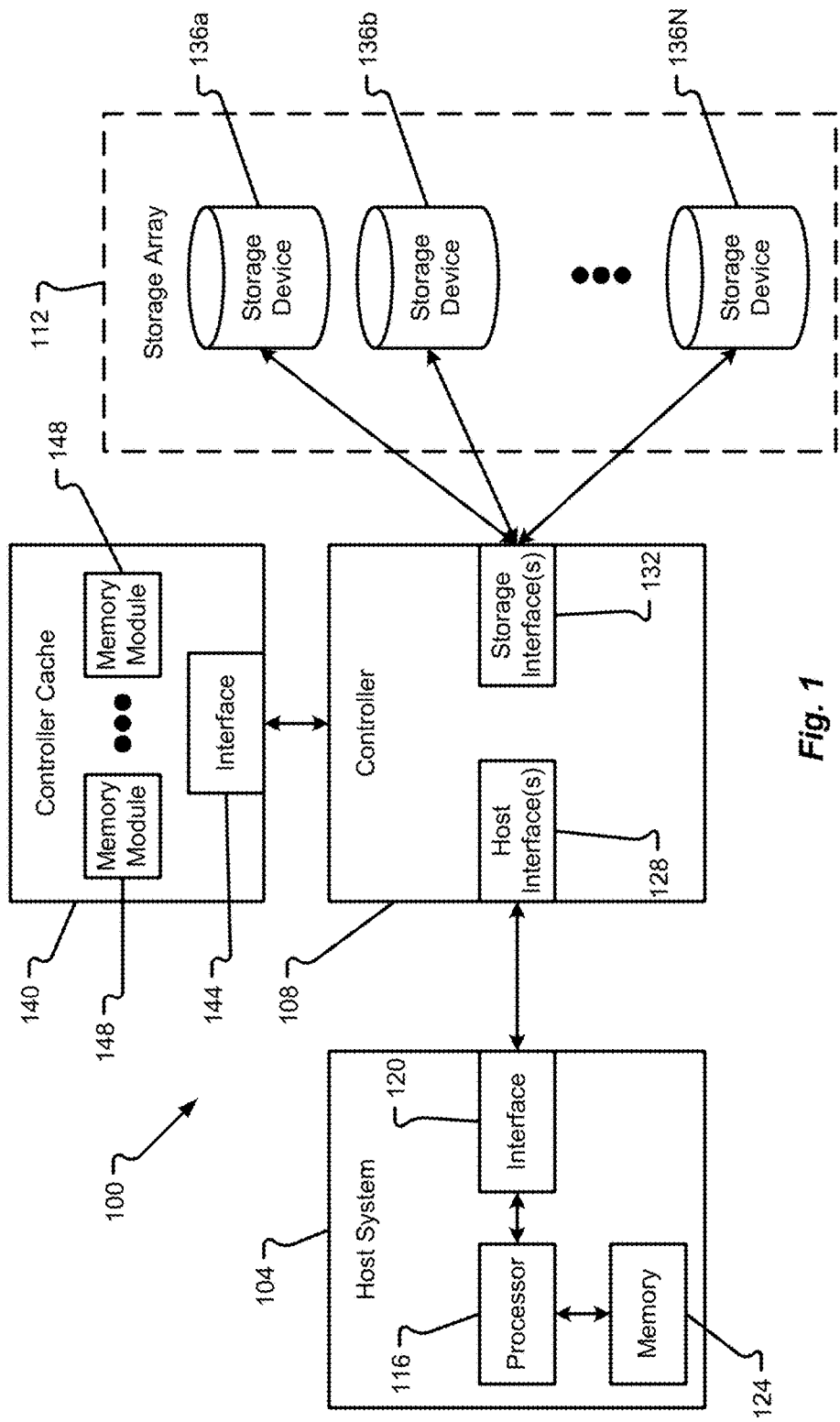
FIG. 1 is a block diagram depicting a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It is being understood that various changes may be made in the function and arrangement of elements without departing from the spirit and scope of the appended claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

As will be discussed in further detail herein, the present disclosure presents a hardware-accelerated cache buffering and flush process to enable hardware acceleration. The disclosed processes are particularly useful in architectures that utilize parity (e.g., a RAID-5 or RAID-6 type of architecture). A unique buffer strategy is disclosed herein that ensures optimal buffer utilization and enables the freeing of buffers at various stages. A unique message data structure (e.g., a flush LMID or parity request LMID) is also disclosed herein that can hold all of the information required for flushing a row in a memory device.

During a flush operation, the snapshot of the buffers along with the cache segments for a row can be taken in the ISGL and the same is used until the flush operation completes. Before starting a flush operation, a cache segment/row may be removed from a dirty list, hence there can be no more than one flush at a time on a row. While a flush operation is in progress, if a new write is issued to the row, the buffers in the cache segments in the row are replaced with the new buffers.

The current flush operation continues to use the buffers in the ISGL snapshot and hence does not interfere with the write operation or read operation which would use the buffers that are present in the Cache Segments. Read, write, and/or flush commands can be issued in parallel on a row and there is no need for additional synchronization like taking region locks as in traditional caching algorithms.

Since the flush operation might involve allocating new buffers to fetch the old data from the drives for calculating new parity, a process where buffers of larger granularity (e.g., 64K) are used. These buffers are still indexed based on smaller scale (e.g., 4K size) allowing for the same type of handling as for the regular smaller buffers (e.g., 4K buffers). In this case, ISGL/RSGL buffer count value will indicate the size of the buffer.

These buffers may be allocated by RAID manager and can be used for holding the data that is read from the drives until the XOR operation is completed. In some embodiments, an ISGL/RSGL can uniquely identify filler buffers using a special tag (e.g., a Filler-type tag). These buffers are allocated by RAID manager and used to fill in the gaps. The utilization of a filler buffers aids in various stages of the flush process. For instance, a read fillers option ensures that data is read from the drive while reading the drive data ensures that data is read only into filler buffers while non-filler buffers are skipped. As another example, an XOR skip filler may be employed that is based on utilization of an XOR engine to skip the XOR operation on the filler buffers.

In some embodiments, all blocks in an arm (e.g., in a RAID volume) need not be dirty. Hence, when a cache segment for an arm indicates that a particular block is not valid, then a skip-type ISGE is added to the ISGL to indicate a gap. Whenever the gap is larger than a single block, a skip-type ISGE count indicates the number of missing blocks.

When a dirty arm has gap skips, writing small chunks to the drives is not desirable. Accordingly, during the Flush operation, the missing data is read into RSGLs using RAID manager buffers. These skips are then replaced by the RAID manager buffers in the ISGL. This ensures that after the XOR operation is completed the data on the dirty drives can be written in a single I/O command.

According to some embodiments, a filler buffer can be sub-categorized into two types to aid in freeing of the buffers at various stages. One type of filler buffer is an outer filler buffer and another type of filler buffer is an inner filler buffer. Outer filler buffers may be used to fill in the leading or trailing missing buffers to align all the arms in ISGL or RSGL for the XOR operation. The inner filler buffers may be required to fill in the gap skips (not leading and trailing missing buffers)

After the XOR operation is completed, all the RSGLs and buffers that are not required for a write operation may be freed up ensuring that resources are optimally deployed. After the write operation, the remaining resources can be freed up.

To close the write hole for a RAID 5/6 volume, the write journal technique disclosed herein may rely on ISGLs being persistent, so that they can be replayed in case of failure, and may further require that buffers allocated for the parity arms are represented in the ISGL.

For a RAID 5 volume, the cache frame that is present in the dirty list or dirty tree can be of a row type (For a row) or a cache segment type (For a strip). If it is for a strip, the buffer segment/extent section can be used to describe the dirty buffers for the strip. If is for a row type, then the strips section contains the cache segments for each dirty arm in the row.

The flush operation ensures that parity is generated and further ensures that the dirty and parity data is written onto the physical drives. While ISGL data structure holds the snapshot of the dirty data including the cache segment/row IDs, a flush LMID can be used to bind together all the arms information for the corresponding row. The flush LMID (or parity request LMID) is then forwarded to different modules to perform the actual operation based on the stage of the flush operation. In some embodiments, an ISGL describes the row from the first dirty arm to the last dirty arm. Each arm is described beginning with the first sector of the arm, but missing trailing blocks can be ignored. In some embodiments, an implicit terminator or missing arm or cache segment type ISGE provides an indication that remaining blocks are missing and that a skip is omitted intentionally.

A large gap (e.g., an inner or outer gap) should be described by one non-zero count SKIP Scatter Gather Element (SGE) followed by multiple zero-count SGEs, since the RAID manager may fill in the gap and it needs one SGE for each buffer chunk used for this purpose. In some embodiments, this occurs because the RAID manager buffer type is of a particular size (e.g., 64K, which may include 16

4K buffers and one SGE cannot represent more than 16 buffers). A TERMINATOR SGE is then used to mark the end of the ISGL chain. It is implicit that while adding to ISGL or RSGL, if the end of ISGL/RSGL is reached, a new ISGL/RSGL is allocated and is added as chain to the previous ISGL/RSGL.

In some embodiments, various steps involved in the flush include:
- Allocating ISGLs and populating the ISGLs with the Cache Segment Identifiers (CSIDs) and the corresponding buffer segment IDs of each of the strip that is dirty or skip type ISGEs if the blocks are missing or missing arm type ISGE if the arm is not dirty.
- Allocating flush LMID and then populating the flush LMID with ISGL ID and ISGL offset for all the dirty arms, populating dirty bitmap etc.
- Allocating RSGLs and temporary buffers to read the missing data or old data
- Performing the XOR operation and generating parity
- Freeing up the temporary buffers that are not required for writes and issuing writes to the backend (e.g., an SAS Core).
- Freeing up the remaining resources after the writes are completed
- Freeing up the buffers, cache segment buffer section, cache segment/row where possible In some embodiments, the ISGL describes the strip from the beginning until the end. For the blocks where there are no buffers in the cache, a skip type ISGE is added and for contiguous such blocks a cumulative skip count ISGE is added. When the RAID manager allocates temporary buffers for the purpose of a flush, the RAID manager would populate those buffers into the ISGL also so that a single write can be issued later after the XOR instead of multiple small writes. Hence, while adding skip type ISGE, enough ISGEs are provisioned by adding additional dummy ISGEs. Since the maximum number of buffers in a large buffer is 16, for example, skipcount/16 is the number of ISGEs that are provisioned extra by adding dummy ISGEs.

A buffer allocation strategy is also proposed herein. The proposed buffer allocation strategy provides an allocation process that is optimal for hardware caching solutions. Using the same buffer size of 4K in the RAID manager for allocating temporary buffers could turn out to be expensive as they consume more SGLs and also more processing time for allocation, parsing ISGLs, etc.

Accordingly, for allocating a temporary buffer a larger chunk of 64 KB can be used. All the 4K buffers from the buffer manager and 64 KB buffers from RAID manager access the same memory region and all the buffers are indexed with 4 KB size. A 64 KB chunk contains 16 4 KB buffers. The RAID manager would allocate 64 KB chunk and use the sub-buffers that are contained in it. As a non-limiting example: a 64 KB chunk X is allocated. If the RAID manager needs to use 2 buffers then, X and X+1 are used.

RAID manager may also use various pools for allocation purposes based on how fast each buffer can be freed. For example, buffers can be segregated as inner fillers and outer fillers. All the buffers for inner fillers may come from one pool. All arms that need inner buffers will share this pool. Similarly the outer fillers may be allocated from a different pool. This distinction between inner fillers and outer fillers aids in freeing up the buffers at various stages during the flush operation.

Although embodiments of the present disclosure will be described in connection with managing a RAID architecture (e.g., a RAID-5 or RAID-6 type of architecture), it should be appreciated that embodiments of the present disclosure are not so limited. In particular, any controller that finds benefits associated with buffer allocation strategies and/or hardware acceleration can implement some or all of the functions and features described herein.

With reference to FIGS. 1-22E, various embodiments of the present disclosure will be described. While many of the examples depicted and described herein will relate to a RAID architecture, it should be appreciated that embodiments of the present disclosure are not so limited. Indeed, aspects of the present disclosure can be used in any type of computing system and/or memory environment. In particular, embodiments of the present disclosure can be used in any type of caching scheme (whether employed by a RAID controller or some other type of device used in a communication system). In particular, hard drives, hard drive controllers (e.g., SCSI controllers, SAS controllers, or RAID controllers) may be configured to implement embodiments of the present disclosure. As another example, network cards or the like having cache memory may also be configured to implement embodiments of the present disclosure.

With reference now to FIG. 1, additional details of a computing system 100 capable of implementing hashing methods and various cache lookup techniques will be described in accordance with at least some embodiments of the present disclosure. The computing system 100 is shown to include a host system 104, a controller 108 (e.g., a SCSI controller, a SAS controller, a RAID controller, etc.), and a storage array 112 having a plurality of storage devices 136a-N therein. The system 100 may utilize any type of data storage architecture. The particular architecture depicted and described herein (e.g., a RAID architecture) should not be construed as limiting embodiments of the present disclosure. If implemented as a RAID architecture, however, it should be appreciated that any type of RAID scheme may be employed (e.g., RAID-0, RAID-1, RAID-2, . . . , RAID-5, RAID-6, etc.).

In a RAID-0 (also referred to as a RAID level 0) scheme, data blocks are stored in order across one or more of the storage devices 136a-N without redundancy. This effectively means that none of the data blocks are copies of another data block and there is no parity block to recover from failure of a storage device 136. A RAID-1 (also referred to as a RAID level 1) scheme, on the other hand, uses one or more of the storage devices 136a-N to store a data block and an equal number of additional mirror devices for storing copies of a stored data block. Higher level RAID schemes can further segment the data into bits, bytes, or blocks for storage across multiple storage devices 136a-N. One or more of the storage devices 136a-N may also be used to store error correction or parity information.

A single unit of storage can be spread across multiple devices 136a-N and such a unit of storage may be referred to as a stripe. A stripe, as used herein and as is well known in the data storage arts, may include the related data written to multiple devices 136a-N as well as the parity information written to a parity storage device 136a-N. In a RAID-5 (also referred to as a RAID level 5) scheme, the data being stored is segmented into blocks for storage across multiple devices 136a-N with a single parity block for each stripe distributed in a particular configuration across the multiple devices 136a-N. This scheme can be compared to a RAID-6 (also referred to as a RAID level 6) scheme in which dual parity blocks are determined for a stripe and are distributed across each of the multiple devices 136a-N in the array 112.

One of the functions of the controller 108 is to make the multiple storage devices 136a-N in the array 112 appear to a host system 104 as a single high capacity disk drive. Thus, the controller 108 may be configured to automatically distribute data supplied from the host system 104 across the multiple storage devices 136a-N (potentially with parity information) without ever exposing the manner in which the data is actually distributed to the host system 104.

In the depicted embodiment, the host system 104 is shown to include a processor 116, an interface 120, and memory 124. It should be appreciated that the host system 104 may include additional components without departing from the scope of the present disclosure. The host system 104, in some embodiments, corresponds to a user computer, laptop, workstation, server, collection of servers, or the like. Thus, the host system 104 may or may not be designed to receive input directly from a human user.

The processor 116 of the host system 104 may include a microprocessor, central processing unit (CPU), collection of microprocessors, or the like. The memory 124 may be designed to store instructions that enable functionality of the host system 104 when executed by the processor 116. The memory 124 may also store data that is eventually written by the host system 104 to the storage array 112. Further still, the memory 124 may be used to store data that is retrieved from the storage array 112. Illustrative memory 124 devices may include, without limitation, volatile or non-volatile computer memory (e.g., flash memory, RAM, DRAM, ROM, EEPROM, etc.).

The interface 120 of the host system 104 enables the host system 104 to communicate with the controller 108 via a host interface 128 of the controller 108. In some embodiments, the interface 120 and host interface(s) 128 may be of a same or similar type (e.g., utilize a common protocol, a common communication medium, etc.) such that commands issued by the host system 104 are receivable at the controller 108 and data retrieved by the controller 108 is transmittable back to the host system 104. The interfaces 120, 128 may correspond to parallel or serial computer interfaces that utilize wired or wireless communication channels. The interfaces 120, 128 may include hardware that enables such wired or wireless communications. The communication protocol used between the host system 104 and the controller 108 may correspond to any type of known host/memory control protocol. Non-limiting examples of protocols that may be used between interfaces 120, 128 include SAS, SATA, SCSI, FibreChannel (FC), iSCSI, ATA over Ethernet, InfiniBand, or the like.

The controller 108 may provide the ability to represent the entire storage array 112 to the host system 104 as a single high volume data storage device. Any known mechanism can be used to accomplish this task. The controller 108 may help to manager the storage devices 136a-N (which can be hard disk drives, sold-state drives, or combinations thereof) so as to operate as a logical unit. In some embodiments, the controller 108 may be physically incorporated into the host device 104 as a Peripheral Component Interconnect (PCI) expansion (e.g., PCI express (PCI)e) card or the like. In such situations, the controller 108 may be referred to as a RAID adapter.

The storage devices 136a-N in the storage array 112 may be of similar types or may be of different types without departing from the scope of the present disclosure. The storage devices 136a-N may be co-located with one another or may be physically located in different geographical locations. The nature of the storage interface 132 may depend upon the types of storage devices 136a-N used in the storage array 112 and the desired capabilities of the array 112. The storage interface 132 may correspond to a virtual interface or an actual interface. As with the other interfaces described herein, the storage interface 132 may include serial or parallel interface technologies. Examples of the storage interface 132 include, without limitation, SAS, SATA, SCSI, FC, iSCSI, ATA over Ethernet, InfiniBand, or the like.

The controller 108 is shown to have communication capabilities with a controller cache 140. While depicted as being separate from the controller 108, it should be appreciated that the controller cache 140 may be integral to the controller 108, meaning that components of the controller 108 and the controller cache 140 may be contained within a single physical housing or computing unit (e.g., server blade). The controller cache 140 is provided to enable the controller 108 to perform caching operations. The controller 108 may employ caching operations during execution of I/O commands received from the host system 104. Depending upon the nature of the I/O command and the amount of information being processed during the command, the controller 108 may require a large number of cache memory modules 148 (also referred to as cache memory) or a smaller number of cache memory modules 148. The memory modules 148 may correspond to flash memory, RAM, DRAM, DDR memory, or some other type of computer memory that is quickly accessible and can be rewritten multiple times. The number of separate memory modules 148 in the controller cache 140 is typically larger than one, although a controller cache 140 may be configured to operate with a single memory module 148 if desired.

The cache interface 144 may correspond to any interconnect that enables the controller 108 to access the memory modules 148, temporarily store data thereon, and/or retrieve data stored thereon in connection with performing an I/O command or some other executable command. In some embodiments, the controller cache 140 may be integrated with the controller 108 and may be executed on a CPU chip or placed on a separate chip within the controller 108. In such a scenario, the interface 144 may correspond to a separate bus interconnect within the CPU or traces connecting a chip of the controller cache 140 with a chip executing the processor of the controller 108. In other embodiments, the controller cache 140 may be external to the controller 108 in which case the interface 144 may correspond to a serial or parallel data port.

Figure 2:
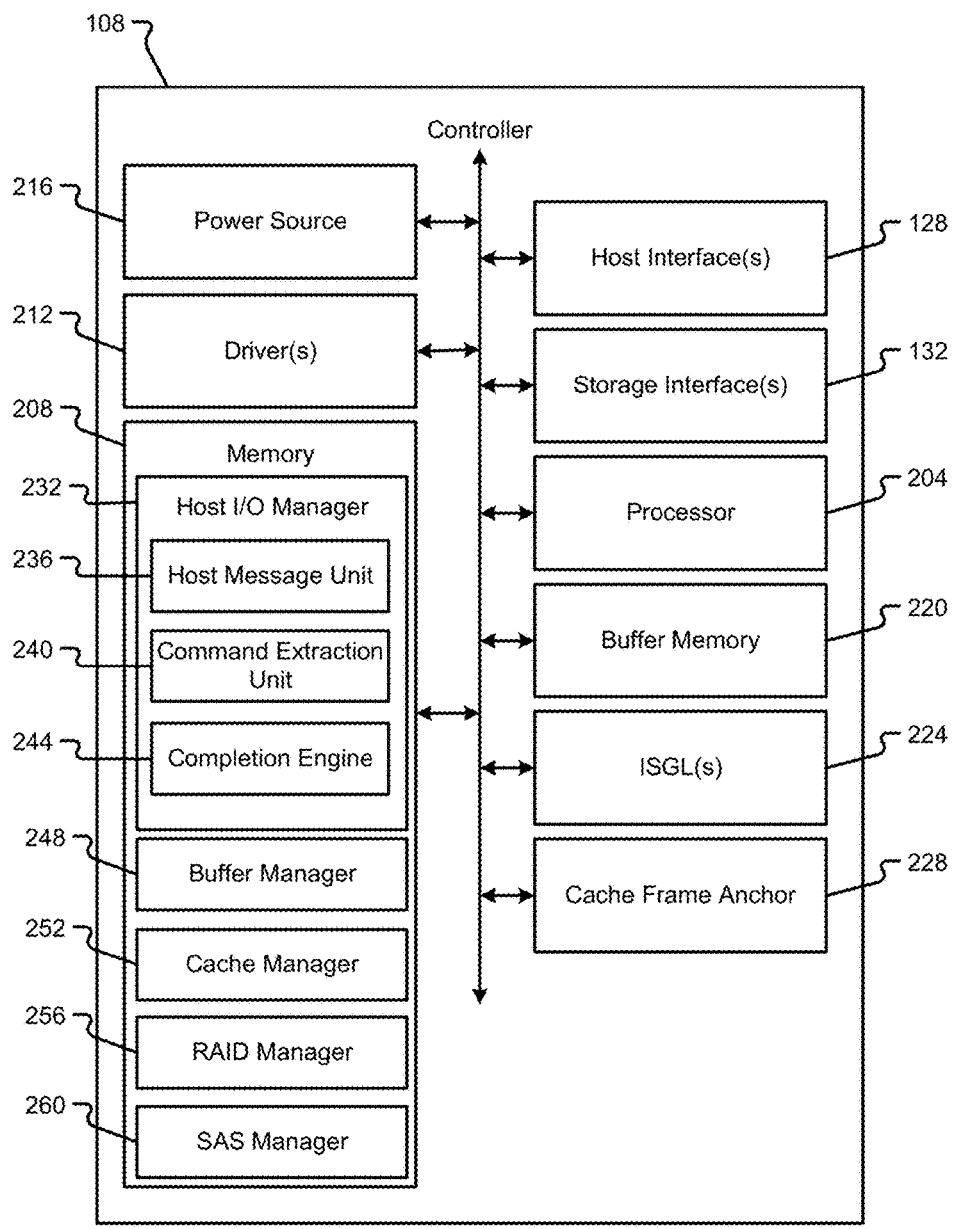
FIG. 2 is a block diagram depicting details of an illustrative controller in accordance with at least some embodiments of the present disclosure.

With reference now to FIG. 2 additional details of a controller 108 will be described in accordance with at least some embodiments of the present disclosure. The controller 108 is shown to include the host interface(s) 128 and storage interface(s) 132. The controller 108 is also shown to include a processor 204, memory 208 (e.g., a main controller memory), one or more drivers 212, and a power source 216.

The processor 204 may include an Integrated Circuit (IC) chip or multiple IC chips, a CPU, a microprocessor, or the like. The processor 204 may be configured to execute instructions in memory 208 that are shown to include a host I/O manager 232, a buffer manager 248, a cache manager 252, a RAID manager 256, and a SAS manager 260. Furthermore, in connection with performing caching or buffer functions, the processor 204 may utilize buffer memory 220, one or more Internal Scatter Gather Lists (ISGLs) 224, and a cache frame anchor 228. The host I/O manager 232 is shown to include a plurality of sub-routines that include, without limitation, a host message unit 236, a command extraction unit 240, and a completion engine 244.

Each of the components (e.g., host I/O manager 232, buffer manager 248, cache manager 252, RAID manager 256, and SAS manager 260) may correspond to different functional blocks that operate in their own local memory loading the global memory (e.g. a global buffer memory 220 or memory 208) on an as-needed basis. Each of these different functional blocks can be accelerated by different hardware threads without departing from the scope of the present disclosure.

The memory 208 may be volatile and/or non-volatile in nature. As indicated above, the memory 208 may include any hardware component or collection of hardware components that are capable of storing instructions and communicating those instructions to the processor 204 for execution. Non-limiting examples of memory 208 include RAM, ROM, flash memory, EEPROM, variants thereof, combinations thereof, and the like. Similarly, the buffer memory 220 may be volatile or non-volatile in nature. The buffer memory may be configured for multiple read/writes and may be adapted for quick access by the processor 204.

The instructions stored in memory 208 are shown to be different instruction sets, but it should be appreciated that the instructions can be combined into a smaller number of instruction sets without departing from the scope of the present disclosure. The host I/O manager 232, when executed, enable the processor 204 to manage I/O commands received from the host system 104 and facilitate higher-level communications with the host system 104. In some embodiments, the host I/O manager 232 may utilize the host message unit 236 to process incoming messages received from the host system 104. As a non-limiting example, the controller 108 may receive messages from the host system 104 in an NPI protocol. The host message unit 236 may bring down the messages received from the host system 104 and pass the content of the messages to the command extraction unit 240. The command extraction unit 240 may be configured to determine if a particular command in a message is acceleratable (e.g., capable of being passed to a particular functional block to facilitate hardware acceleration). If a command is determined to be acceleratable, then the command extraction unit 240 may implement a hardware acceleration process and generate an appropriate Local Message ID (LMID) that represents all of the information received from the host system 104 (in the command). The LMID effectively represents the command received from the host system 104, but is in a different format that is understandable by the managers 248, 252, 256, 260. The command extraction unit 240 may, in some embodiments, route the various commands (e.g., LMIDs) to one or more of the buffer manager 248, cache manager 252, RAID manager 256, and SAS manager 260. The routing of the commands may depend upon a type of the command and the function to be executed. The completion engine of the host I/O manager 232 may be responsible for reporting to the host system 104 that an I/O command has been completed by the controller 108.

The buffer manager 248 may include instructions that, when executed, enable the processor 204 to perform various buffer functions. As an example, the buffer manager 248 may enable the processor 204 to recognize a write command and utilize the buffer memory 220 in connection with executing the write command. In some embodiments, any command or function that leverages the buffer memory 220 may utilize the buffer manager 248.

The cache manager 252 may include instructions that, when executed, enable the processor 204 to perform various caching functions. The cache manager 252 may enable the processor 204 to communicate with the controller cache 140 and leverage the memory modules 148 of the controller cache 140. The cache manager 252 may also manage the creation and lifecycle of cache frame anchors 228 and/or ISGLs 224. As an example, as caching functions are executed, one or more cache frame anchors 228 may be created or utilized to facilitate the caching function. As used herein, an ISGL may represent the snapshot of data at a given point in time it is used. In some embodiments, the ISGL is capable of encapsulating all the metadata that is required for an I/O request (e.g. read request, write request, etc.), thereby providing an efficient communication mechanism between various modules for processing the read/write and/or read-ahead operations.

The RAID manager 256 and/or SAS manager 260 may include instructions that, when executed, enable the processor 204 to communicate with the storage array 112 or storage devices 136 therein. In some embodiments, the RAID manager 256 and/or SAS manager 260 may receive commands either directly from the host I/O manager 232 (if no caching was needed) or they may receive commands from the cache manager 252 after an appropriate caching process has been performed. When invoked, the RAID manager 256 and/or SAS manager 260 may enable the processor 204 to finalize read or write commands and exchange data with the storage array 112. Other functions enabled by the RAID manager 256 and/or SAS manager 260 will be described in further detail herein.

The driver(s) 212 may comprise firmware, hardware, software, or combinations thereof that enable the processor 204 to make use of other hardware components in the controller 108. For instance, different drivers 212 may be provided to support functions of the interfaces 128, 132. As another example, separate drivers 212 may be provided to support functions of the buffer memory 220. The drivers 212 may perform the low-level routines that allow the processor 204 to communicate with the other hardware components and respond to commands received from the processor 204.

The power source 216 may correspond to hardware components that provide the controller 108 with the power necessary to run the processor 204 and other components. As an example, the power source 216 may correspond to a power converter that receives AC power from an external source (e.g., a power outlet) and converts the AC power into DC power that is useable by the other hardware components of the controller 108. Alternatively or additionally, the power source 216 may correspond to an internal power source (e.g., a battery pack, bank of capacitors, etc.) that provides power to the hardware components of the controller 108.

Figure 3:
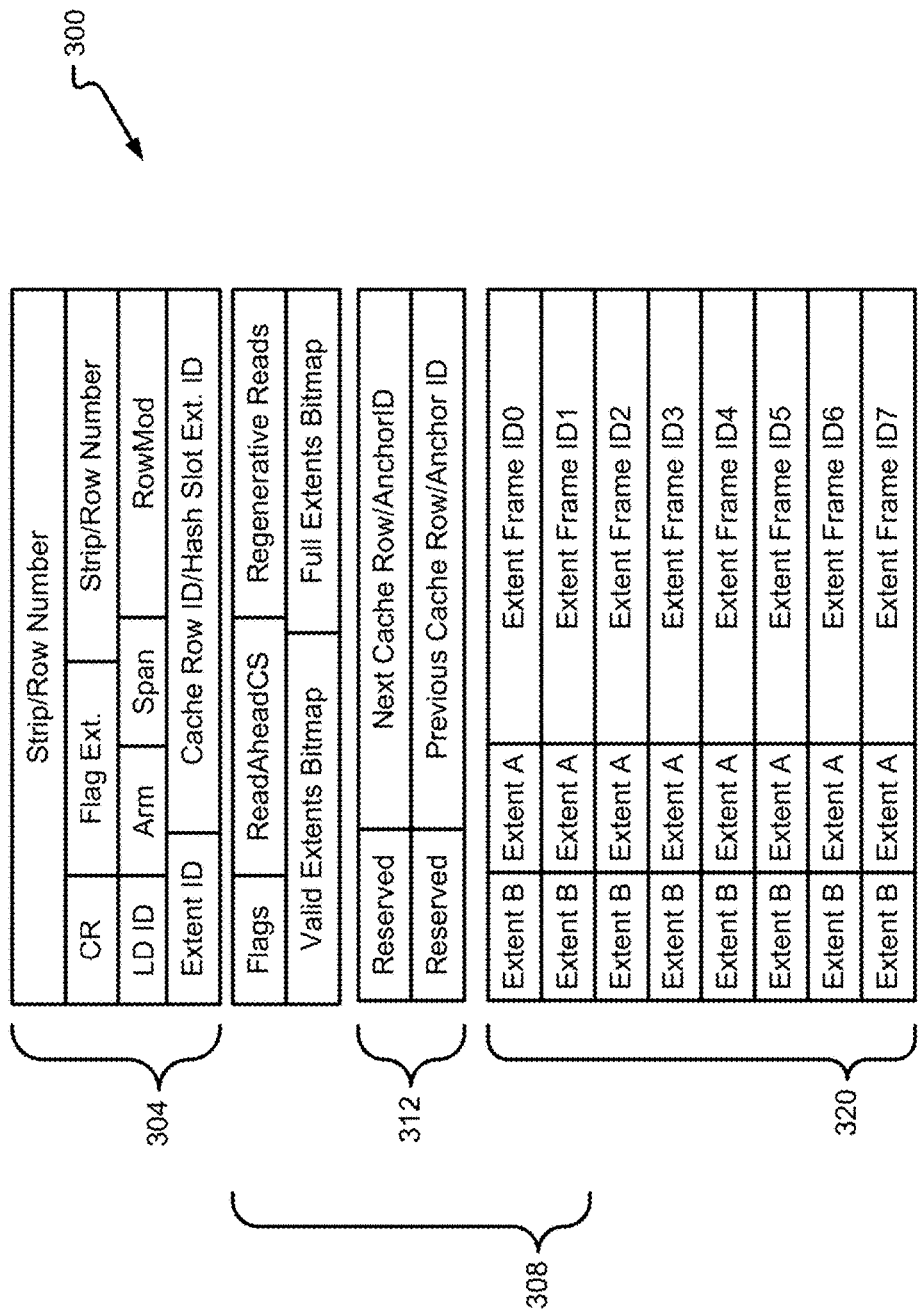
FIG. 3 is a block diagram depicting details of a first data structure used in accordance with at least some embodiments of the present disclosure.

With reference now to FIG. 3, additional details of a first data structure 300 will be described in accordance with at least some embodiments of the present disclosure. The first data structure 300 may be used to store cache segment strip metadata. As a non-limiting example, the first data structure 300 may correspond to part or all of a cache frame anchor 228. Although FIG. 3 shows the data structure 300 as having a particular layout/organizational structure, it should be appreciated that the data structure 300 may be configured in any number of ways without departing from the scope of the present disclosure. The data structure 300 may correspond to a data structure that is created and managed by the cache manager 252 or other components in memory 208.

The data structure 300 is shown to include a hash section 304 as well as a dirty list section 308 that includes first and second sub-sections 312, 316, respectively. The data structure 300 is also shown to include an extents section 320. The various sections of the data structure 300 may be used to store data that enables the controller 208 to utilize variable stripe sizes, thereby taking advantage of different workloads (where different types of commands require different amounts of memory and processing capabilities). In some embodiments, the cache manager 252 shouldn't need to worry about strip sizes, but it would be desirable to enable the cache manager 252 to effectively and efficiently respond to different types read of commands in an appropriate way.

In some embodiments, the hash section 304 includes a number of fields usable in connection with hash searches and other data lookup routines. As a non-limiting example, the hash section 304 may include a strip/stripe number field, a CR field, a flags extension field, a Logical Disk (LD) ID field, an Arm field, a Span field, a RowMod field, an extent ID field, and a cache row ID/hash slot extension ID field.

The strip/stripe number field may store data that identifies the strip/stripe for which the data structure 300 is being used. In some embodiments, the strip/stripe field may uniquely identify a strip or stripe. In some embodiments, the strip/stripe field may identify a memory location (e.g., a starting location) of a strip or stripe of data stored in a storage device 136. For instance, the strip/stripe field may store a number that has been assigned to a particular strip or stripe of data.

The flag extension field may store information describing a memory location of a flag or an identifier of a flag associated with the data structure 300. Various type of flags may be used to identify a type of data stored in connection with the data structure 300 and the flag extension field may be used to identify that type of data.

The LD ID field may contain an identifier or multiple identifiers of logical disks used to store the data. The logical disk may be identified by a memory location or by some alias used in a naming scheme for the logical disks being managed by the controller 108.

The arm field may store a current value of a logical arm parameter. The Span field may store a value describing the span number in the Raid Volume (In case of single span the value is 0.) The extent ID field may store information uniquely identifying an extent frame from among other extent frames. The cache row ID/hash slot extension ID field may contain data describing or uniquely identifying a cache row and/or hash slot extension.

The dirty list section 308 is shown to include a flags field, a readaheadCS field, a regenerative reads field, a valid extents bitmap field, and a full extents bitmap field. The dirty list section 308 is also shown to include a first sub-section 312.

The flags field in the dirty list section 308 may contain an identifier of one or more flags associated with the dirty list identified by the data structure 300. The regenerative reads field may contain a count of a number of reads performed in connection with Cache Segment or Row, a specific piece of data, and/or in connection with a read operation. The valid extents bitmap may contain a link to a bitmap stored in local controller memory or may actually correspond to a bitmap identifying a number and location of valid extents associated with the data structure 300. The full extents bitmap may contain a link to a bitmap stored in local controller memory or may actually correspond to a bitmap identifying a number of full extents associated with the data structure 300. In some embodiments, the valid extents bitmap and full extents bitmap may refer to one or more extent frames within the extents section 320 of the data structure 300.

The first sub-section 312 of the dirty list section 308 may contain information that describes a cache segment in the dirty list LRU. The information contained in this first sub-section 312 may include a number of reserved data fields, a next cache row/anchor identifier field, and a previous cache row/anchor identifier field. The next cache row/anchor identifier field and previous cache row/anchor identifier field may be used to create a linked lists of cache segments. This linked list may be used in connection with performing any other operation performable by the controller 108. In some embodiments, the next cache row/anchor identifier field and previous cache row/anchor identifier field may be used to track a balance of a tree/chain structure. The data structure 300 may organize data based on LBA and based on a tree structure. As buffer segments are needed to accommodate the need for more buffer memory 220, the data structure 300 may be updated to reflect the addition of buffer segments to the tree/chain. These cache row/anchor identifier fields may store information that links specific cache segment IDs to one another in this tree/chain structure, thereby facilitating the creation of variable stripe sizes. As the names suggest, the next cache row/anchor identifier may contain information that identifies a next cache row or anchor in a chain of cache rows (relative to a currently allocated cache row) whereas the previous cache row/anchor identifier field may contain information that identifies a previous cache row/anchor in a chain of cache row (relative to the currently allocate cache rows). As additional cache rows are added to the tree/chain, the fields may both be updated to continue tracking the progressive building of the cache segment chain.

The extents section 320 is shown to include a plurality of extent frames and corresponding cache segment extents. In some embodiments, the extents may store 2 nibbles of data that describe information contained within the extent section 320. The nibbles in extent section represents the extent number of the extent stored in extent frame. For 1 MB Cache data, there can be max 17 extents (each extent represents 64K data) out of which 1 extent is part of anchor frame and hence extent section represents remaining 16 extents. For example, anchor frame may have extent 5. Extent frame ID0 may have extents 01 and 02. Extent Frame ID1 may have extents 00 and 04. Extent Frame ID2 may have extents 05 and 06. Extent Frame ID3 may have extents 16 and 12 and so on. The extents themselves don't need to be consecutive. By providing the extent frames consecutively in memory (although not a requirement), the extents in the extents section 320 can be scaled to store up to 1 MB of data in total (or more). In some embodiments, each extent can represent up to 64 kB of data. Hence, for a stripe size of 64 kB only one extent that fits in the data structure 300 is needed. For a 1 MB stripe size, sixteen extents would be needed (if each extent represents 64 kB of data), which means that a total of seventeen cache frame anchors would be needed (including the metadata). Although eight extents and extent frames are depicted, it should be appreciated that a greater or lesser number of extents and extent frames can be used without departing from the scope of the present disclosure. By enabling the chaining of multiple extents, variable stripe sizes can be accommodated. In some embodiments, not all extents or extent frames are allocated upon creation of the data structure 300. Instead, extents and extent frames can be allocated on an as-needed basis (e.g., in response to different commands, like a read-ahead command). As can be appreciated, data stored in the data structure 300 may be cleared when the corresponding data is committed to a storage media (e.g., a storage device 136).

Figure 4:
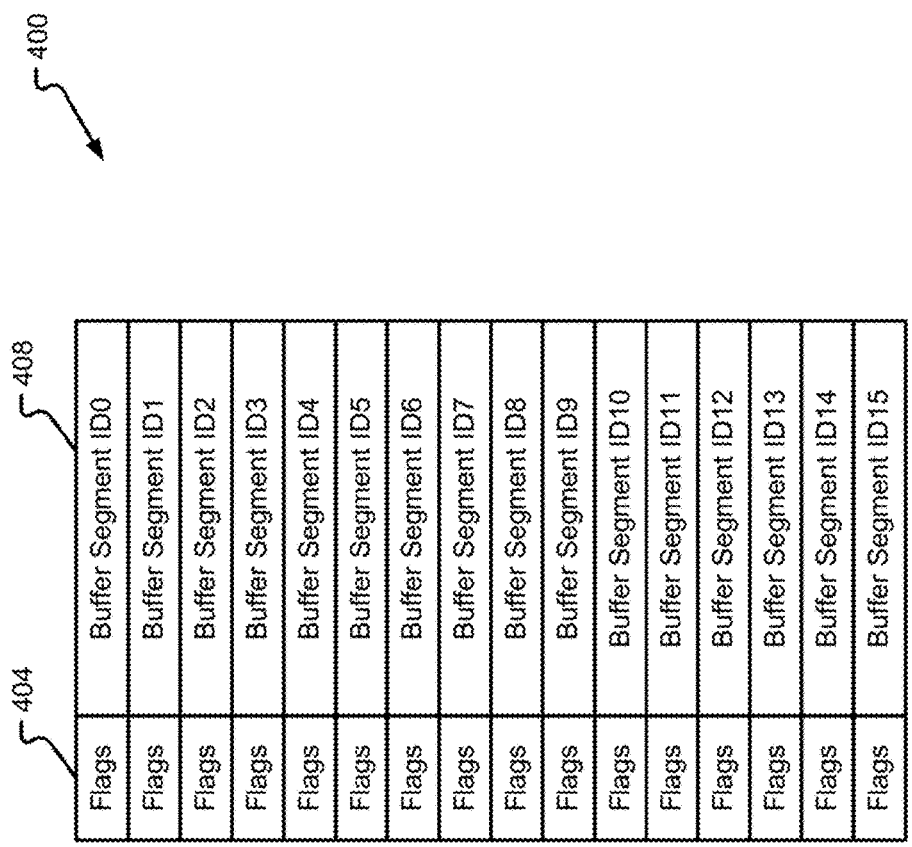
FIG. 4 is a block diagram depicting details of a second data structure used in accordance with at least some embodiments of the present disclosure.

With reference now to FIG. 4, a second data structure 400 will be described in accordance with at least some embodiments of the present disclosure. The second data structure 400 may correspond to a buffer segment section and, more specifically, a cache segment buffer extent section. The second data structure 400 may, therefore, be used in connection with the first data structure 300. Said another way, each data structure 300 may have a corresponding data structure 400 associated therewith to manage the specific buffer extents associated with a cache segment.

The second data structure 400 is shown to include a plurality of buffer segments that include a buffer segment ID field 408 and a flag field 404. The buffer segment ID field 408 may be used to store identification information for buffer segments that have been used in buffer memory 220. A buffer segment section may be configured to store up to twice as much data as the extents section 320. As an example, if the extension section 320 is configured to store up to 32 Bytes of data, then the corresponding buffer segment section may be configured to store up to 64 Bytes of data. The flag field 404 may be configured to store flag information that indicates one or more of: whether a corresponding buffer segment is valid; whether a corresponding buffer segment is dirty; whether a corresponding buffer segment is flushing; whether a corresponding buffer segment has been trimmed; and/or a use count for a corresponding buffer segment.

As can be seen in FIG. 4, a plurality of buffer segment sections (e.g., each row corresponding to a different buffer segment section) are depicted. In some embodiments, each group of buffer segment sections is represented by a corresponding extent. Said another way, an extent can be used to represent a plurality of aligned and contiguous buffer segments. In the depicted embodiment, a first extent is represented by the first plurality of buffer segment sections and a second extent is represented by the second plurality of buffer segment sections. As they come into existence (on an as-needed basis), the extents are grouped two-by-two, sharing one frame. The two nibbles of the extents n1/n0 field in the data structure 300 indicate which two extents share the frame that is referenced by the extent frame ID field. An extent nibble is considered invalid when it is equal to the anchor's identity ID field that is used to indicate the ordinal of the anchor's extent. When a next extent comes into existence, the extent gest stored into the first empty half-frame and if no half-frame is available, then a new frame gets allocated and that frame's ID is stored into the next available extent frame ID location in the data structure 300.

Figure 5:
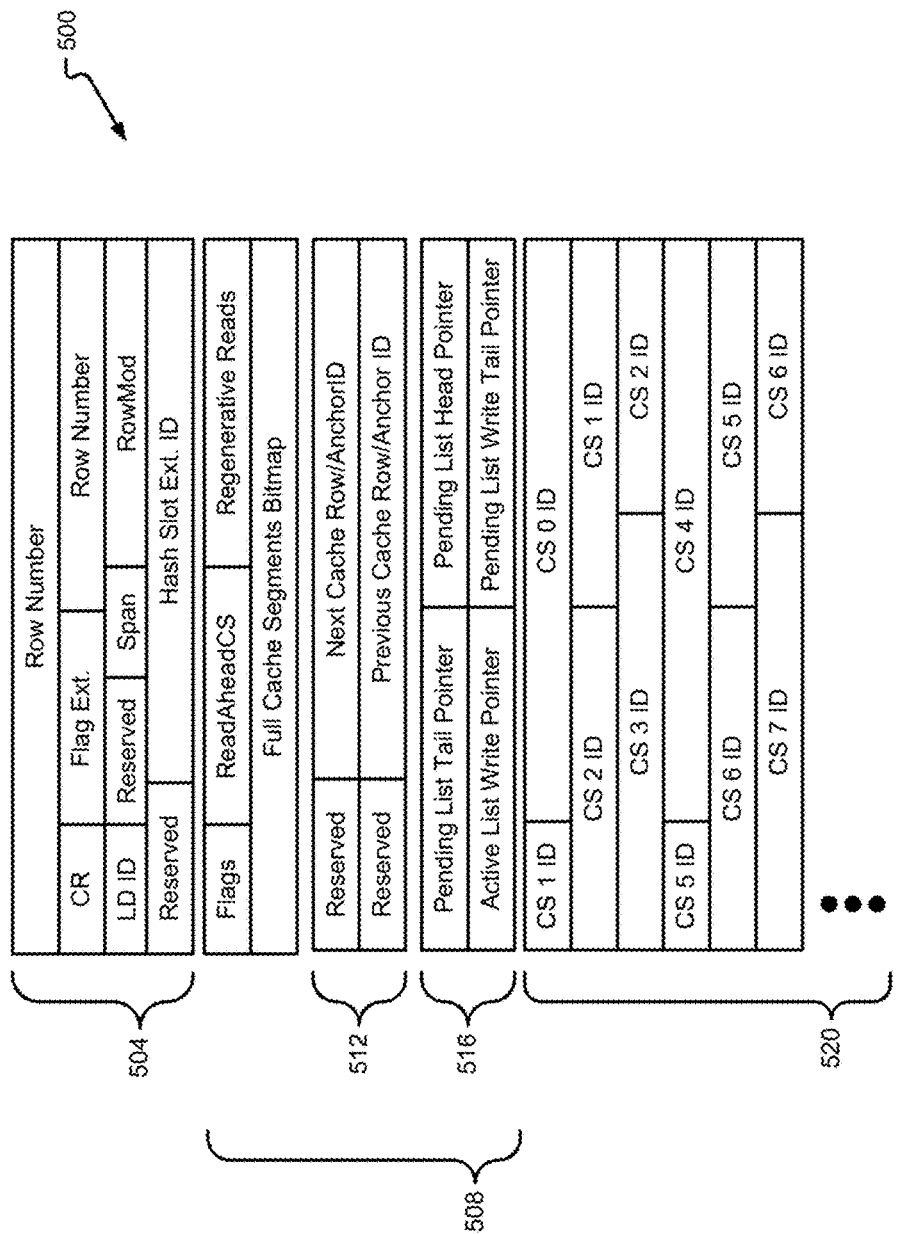
FIG. 5 is a block diagram depicting details of a third data structure used in accordance with at least some embodiments of the present disclosure.

With reference now to FIG. 5, a third data structure 500 will be described in accordance with at least some embodiments of the present disclosure. The third data structure 500 is similar in many respect to the first data structure 300. The third data structure 500, however, may be used to store cache row metadata as opposed to cache segment strip metadata. The third data structure 500 is shown to include a hash section 504 (similar to hash section 304), a dirty list section 508 (similar to dirty list section 308), and a strips section 520. The hash section 504 is shown to include a row number field, a CR field, a flag extension field, an LD ID field, one or more reserved fields, a span field, a RowMod field, and a hash slot extension ID field.

The row number field may be similar to the strip/row number field in the data structure 300 except that there is no strip identifier in the data structure 500. The hash slot extension ID field may be similar to the cache row ID/hash slot extension ID field of the data structure 300 except that there is not identification of a cache row ID in the hash slot extension ID field of data structure 500. Otherwise, many of the features of the hash section 504 are similar to the hash section 304.

The dirty list section 508 is shown to include a flags field, a readaheadCS field, and a regenerative reads count field, similar to the dirty list section 308. The dirty list section 508, however, is shown to include a full cache segments bitmap as compared to a valid extents bitmap and full extents bitmap. The full cache segments bitmap may contain a bitmap for the full cache segments in the strips section 520.

The first sub-section 512 of the dirty list section 508 may be similar or identical to the sub-section 312 of the dirty list section 308. This 512 may be used to create or maintain a tree or linked list of a plurality of data structures 500.

The strips section 520 is shown to include fields for a plurality of cache segment IDs. The cache segment IDs contained in the strips section 520 may contain data or point to data stored for a particular strip or cache segment. Although fields for only eight cache segments (e.g., cache segments 0-7) are depicted, it should be appreciated that the data structure 500 may accommodate a larger number of cache segment fields. For instance, the strips section 520 may include fields for up to 28 cache segment fields without departing from the scope of the present disclosure.

Figure 6:
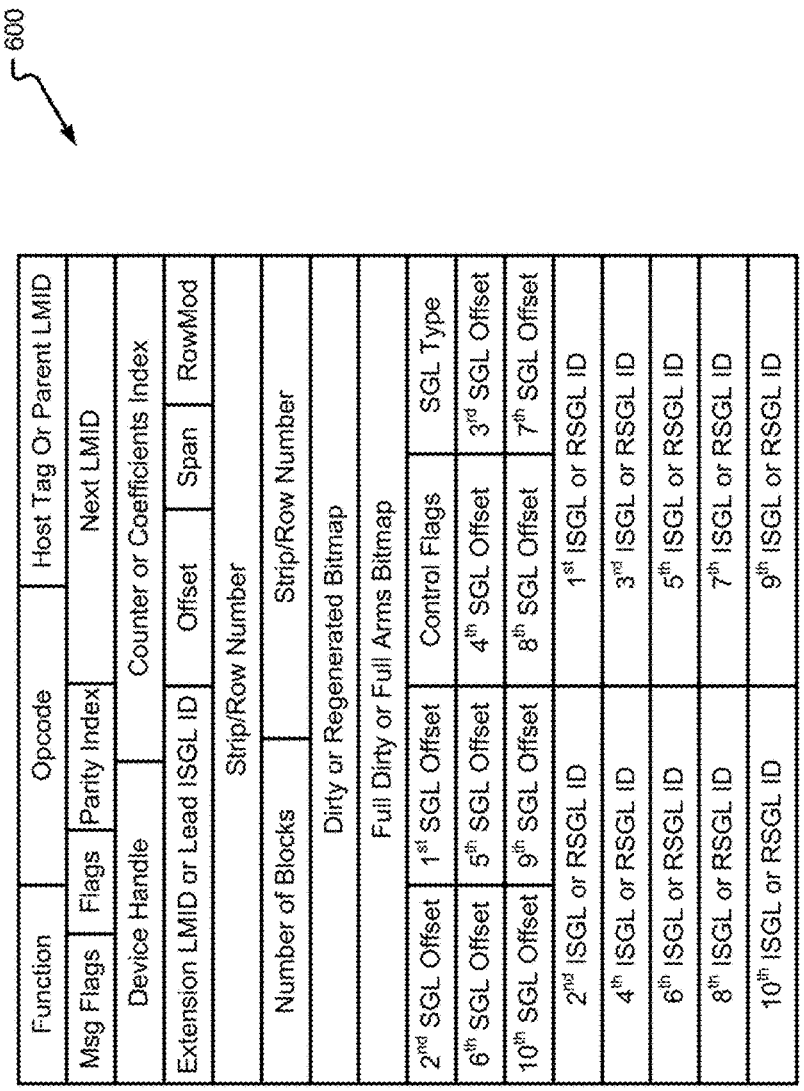
FIG. 6 is a block diagram depicting details of a fourth data structure used in accordance with at least some embodiments of the present disclosure.

With reference now to FIG. 6, additional details of another data structure 600 will be described in accordance with at least some embodiments of the present disclosure. The data structure 600 may correspond to an LMID used to communicate data between the various managers or modules of the controller 108. In some embodiments, the LMID may correspond to a flush LMID that is used to facilitate a hardware-based flush process. The data structure 600 may also be referred to as a flush LMID (parity RAID request). The data structure 600 is shown to include a function identification field, an operational code field, a host tag or parent LMID field, a message flag field, a flags field, a parity index field, a next LMID identification field, a device handle field, a counter or coefficients index field, an extension LMID or lead ISGL field, an offset field, a span field, a RowMod field, a strip/row number field, a number of blocks field, a second strip/row number field, a dirty or regenerated bitmap field, a full dirty or full arms bitmap field, a plurality of SGL offset fields, and a plurality of ISGL or RSGL ID fields.

Some or all of these fields may be used in connection with performing a buffering process, a flush process, etc. The data structure 600 is specifically useful to enable certain managers (e.g., the cache manager 252 and buffer manager 248) to communicate with one another and coordinate their efforts with respect to performing a particular process.

Figure 7:
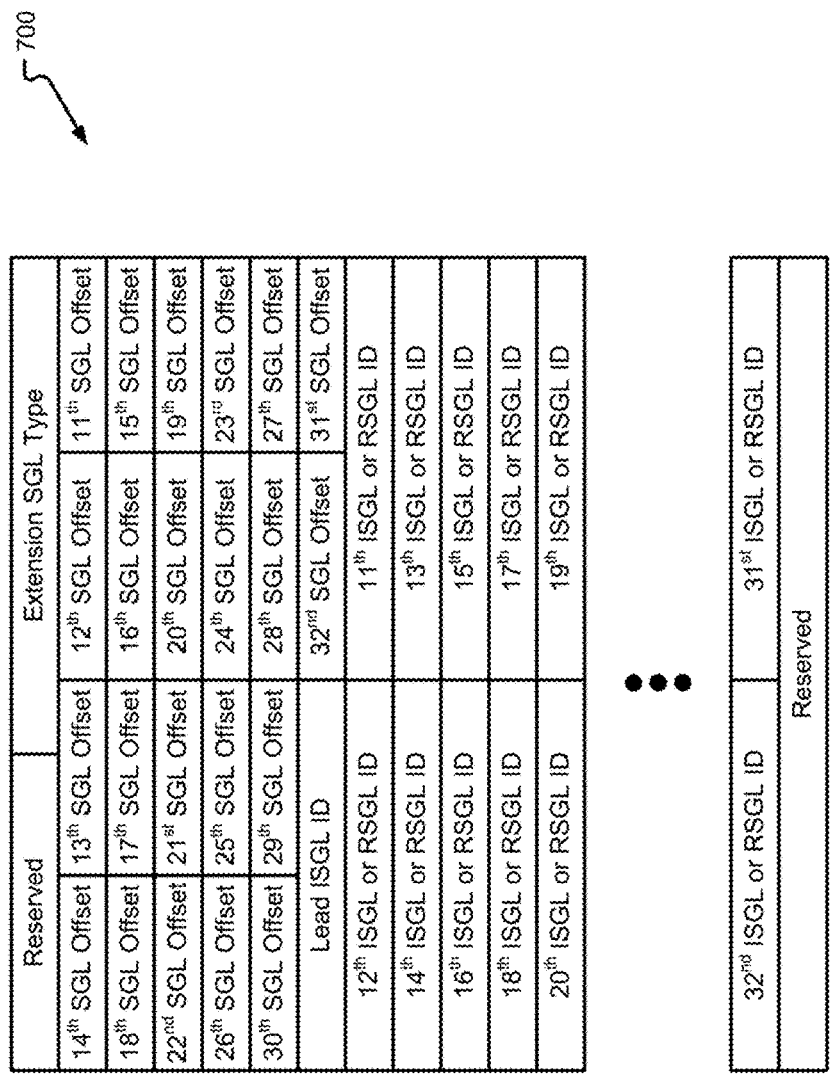
FIG. 7 is a block diagram depicting details of a fifth data structure used in accordance with at least some embodiments of the present disclosure.

FIG. 7 depicts details of another data structure 700 that can be used in accordance with at least some embodiments of the present disclosure. The data structure 700 may correspond to a flush LMID extension (or parity RAID request extension). In other words, the data structure 700 may correspond to an extension of data structure 600. In the depicted example, the data structure 700 includes a reserved field, an extension SGL type field, a number of SGL offset fields, a lead ISGL identifier field, a number of ISGL or RSGL ID fields, and another reserved field. In some embodiments, the extension SGL type identified in the data structure 700 may be the same or similar as the SGL type identifier in the data structure 600. The SGL offsets can be used to help identify where each SGL in the extension begin or end relative to a particular memory location. The lead ISGL ID and other ISGL or RSGL IDs may help to provide a list of identifiers in the tree or linked list.

FIG. 8A depicts an illustrative ISGL structure 800 whereas FIG. 8B depicts a number of Scatter Gather Entry (SGE) descriptors. Referring initially to FIG. 8A, an ISGL may be a data structure of a defined size (e.g., 64B). In some embodiments, the ISGL 800 may include a plurality of flags where each flag has a corresponding SGE entry. As a non-limiting example, each flag may occupy 1B whereas the corresponding SGE entry may occupy 3B. The descriptors shown in FIG. 8B may correspond to the types of information that can be stored in the ISGL 800. As some non-limiting examples, the SGE descriptors may include a terminator type, a dirty buffer segment type, a non-dirty buffer segment type, an inner filler buffer segment type, an outer filler buffer segment type, a cache segment type, a write-in-progress cache segment type, an unmap-in-progress cache segment type, a missing arms count type, and a linked ISGL type. In the depicted example, each different type of SGE descriptor is shown to have a particular SGE flag value and SGE ID value. In use, if an ISGL 800 has a particular flag value indicating an SGE descriptor of a particular type, then an appropriate manager of the controller 108, for example, may utilize the data in the SGE ID field to complete a routine or sub-routine consistent with the type of SGE descriptor identified in the ISGL structure 800.

Figure 9A:
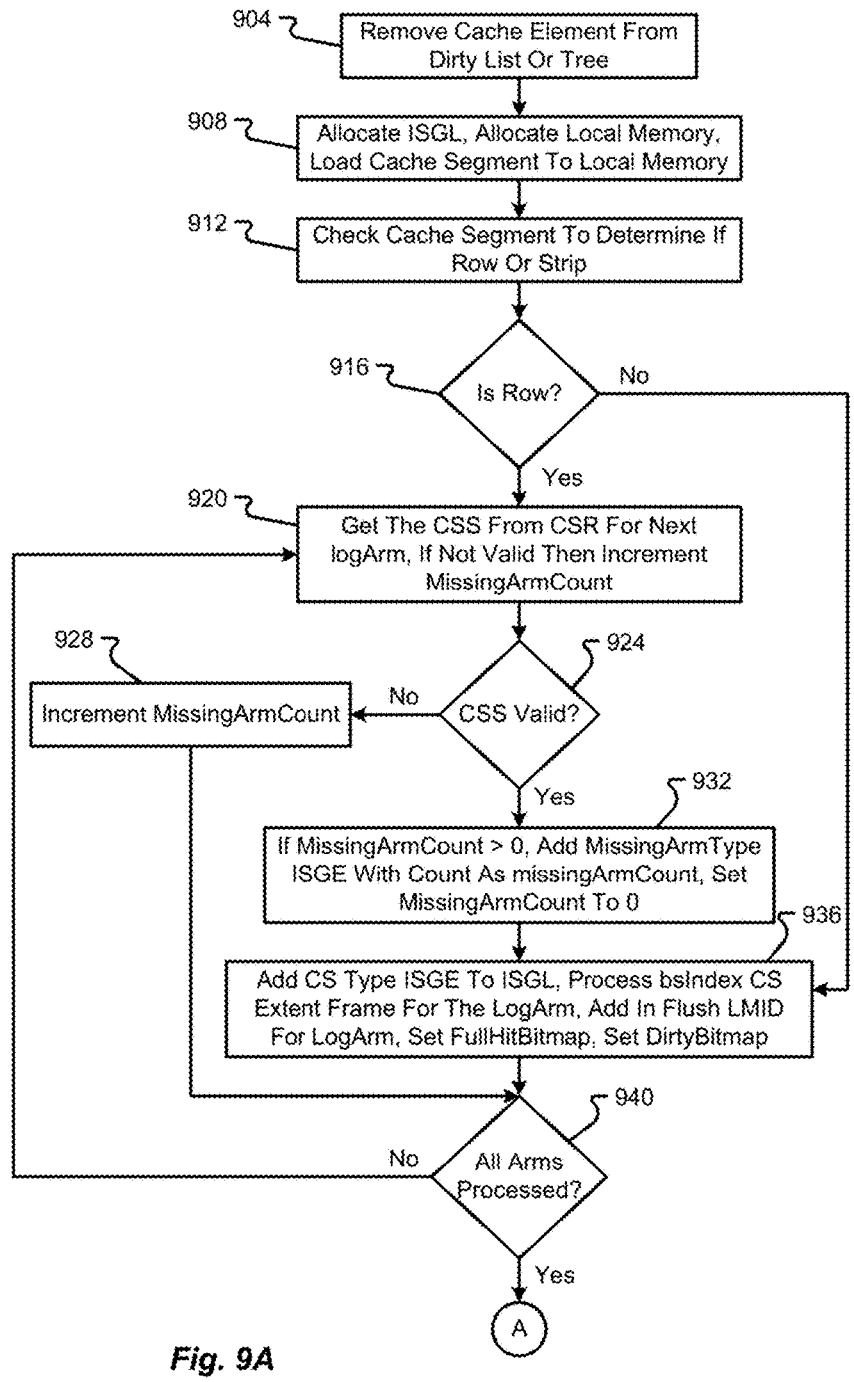
FIG. 9A is a first portion of a flow diagram depicting a method of initiating a flush process in accordance with embodiments of the present disclosure.
Figure 9B:
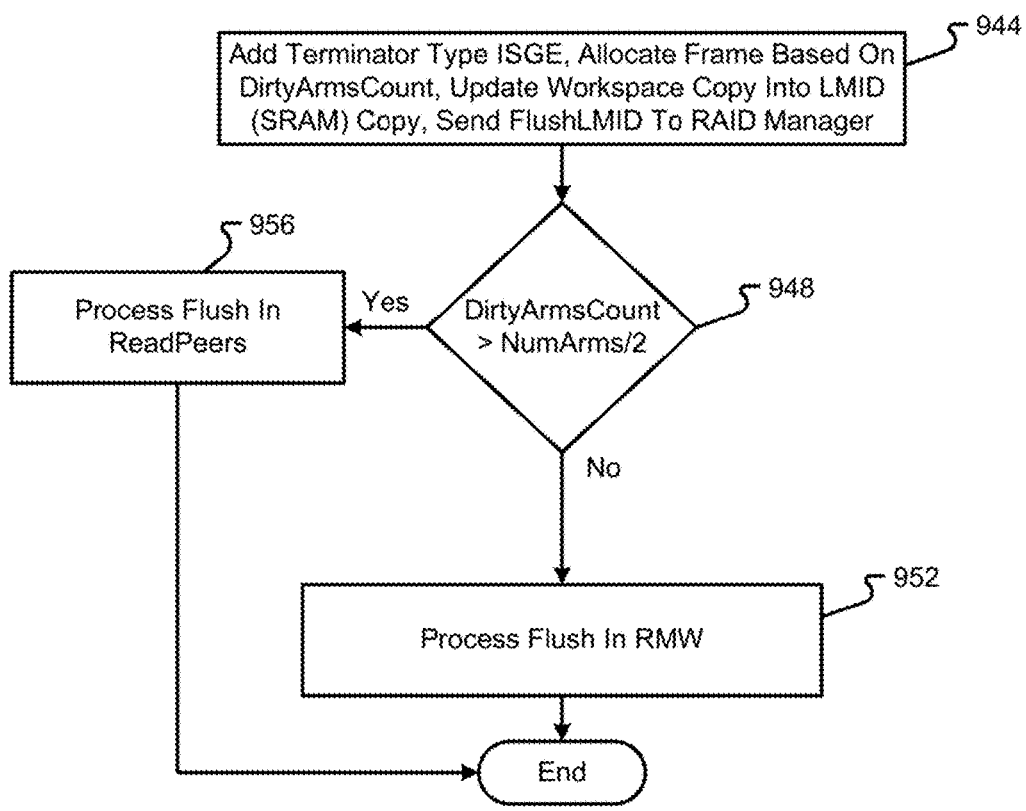
FIG. 9B is a second portion of the flow diagram in FIG. 9A.

With reference now to FIGS. 9A and 9B, a method of initiating a flush process will be described in accordance with at least some embodiments of the present disclosure. Some or all of the steps depicted and described in connection with FIGS. 9A and 9B may be executed by the cache manager 252 and/or RAID manager 256. The method begins by removing a cache segment (for strip or row) from the dirty list or a dirty tree (step 904). Thereafter, the method proceeds by allocating an ISGL, allocating an appropriate amount of local memory for a flush LMID workspace, and loading a cache segment to local memory of the controller 108 (e.g., memory 208 or 220) (step 908). In some embodiments, the flush LMID is allocated such that it can capture all of the ISGL information for each arm in a row. Moreover, as ISGLs are populated, additional chain ISGLs are allocated when the end of an SGL is reached.

In some embodiments, for each dirty ARM within the row, the ISGL is populated with buffer segments from the extent section in cache segments for strips. The flush LMID may then be populated with the ISGL ID and the isglindex for each of the dirty arms. The dirty arms bitmap and full arms bitmap may also be populated in this step.

The method continues by identifying whether a read-modify-write (RMW) process will be used or if a read peers process will be used. In particular, this decision may be made based on whether the cache segment corresponds to a row or strip (step 912). If the decision is made that the cache segment corresponds to a row (step 916), then the method continues by getting the cache segment section (CSS) from the cache segment row (CSR) for the next logArm (step 920). The method then proceeds by determining if the CSS is valid or invalid (step 924). If the CSS is invalid, then the MissingArmCount is incremented (step 928). If the CSS is valid, then the method continues by determining if the MissingArmCount is greater than zero, then a missing arm type of ISGE is added to the ISGL with a count corresponding to the MissingArmCount value (step 932). The method thereafter sets the MissingArmCount to zero (step 932). Then the ISGL 224 is further updated (step 936). In some embodiments, the cache segment type ISGE is added to the ISGL, the bsIndex cache segment extent frame for the logArm is processed, a flush LMID is added for the logArm, the full hit bitmap is set/updated, and the dirty bitmap is set/updated. Thereafter, or if the CSS was invalid, then method continues by determining if all arms have been processed (step 940). If not, then the method returns to step 920.

On the other hand, if all arms have been processed, then the method continues, as shown in FIG. 9B, by generating and populating a flush LMID (step 944). In some embodiments, the step 944 may include adding a terminator type ISGE to the ISGL, allocating a frame based on the DirtyArmsCount, updating the workspace copy into an LMID copy, and sending a flush LMID to the RAID manager 256.

The method then continues by determining if the DirtyArmsCount is greater than the number of arms divided by two (step 948). If so, then the method continues by processing the flush LMID according to a read peers process (step 956). On the other hand, if the DirtyArmsCount is not greater than the number of arms divided by two, then the method continues by processing the flush LMID according to the RMW process (step 952). After completion of step 948 or 956, the method ends.

It should be noted in the above method that the RSGLs may be allocated, the buffers may be allocated, and the missing data may be read from the drives differently based on whether a read peers process is utilized or an RMW process is utilized. Furthermore, buffers may be allocated for parity. Buffers may be allocated and stored in the ISGL. If the RMW process is employed, then old parity may be read from the parity arm. It should also be noted that the ISGL and RSGL IDs can be stored in the flush LMID appropriately for the corresponding arms. It should be further noted that when an ISGE is added to an ISGL, the ISGL index is incremented and if the end of the ISGL is reached, then a new chain ISGL is allocated and the chain ISGL type is added to the previous ISGL last element (helping to create the tree or linked list of ISGLs).

Figure 10A:
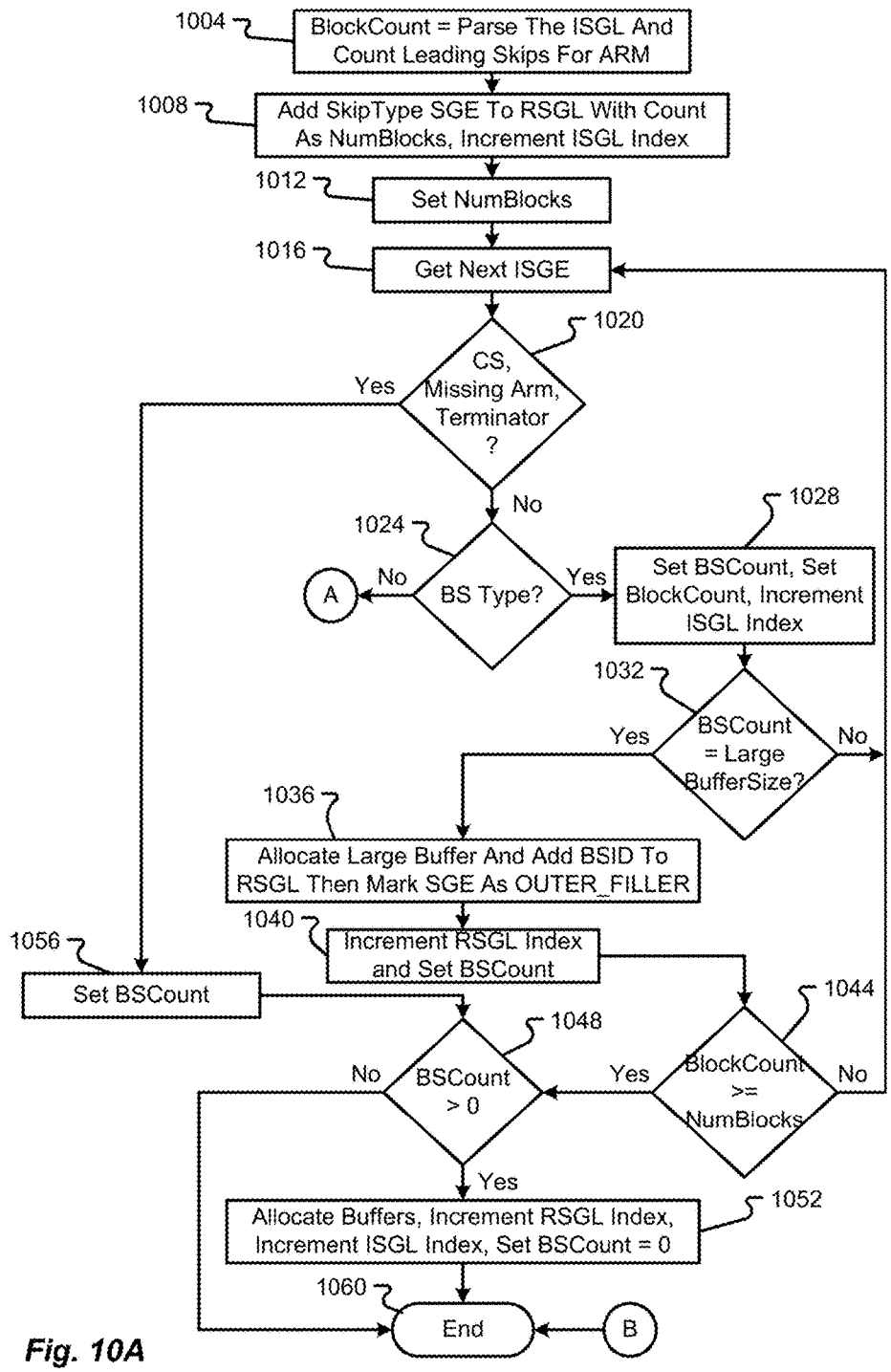
FIG. 10A is a first portion of a flow diagram depicting a first method of allocating alias buffers in accordance with embodiments of the present disclosure.
Figure 10B:
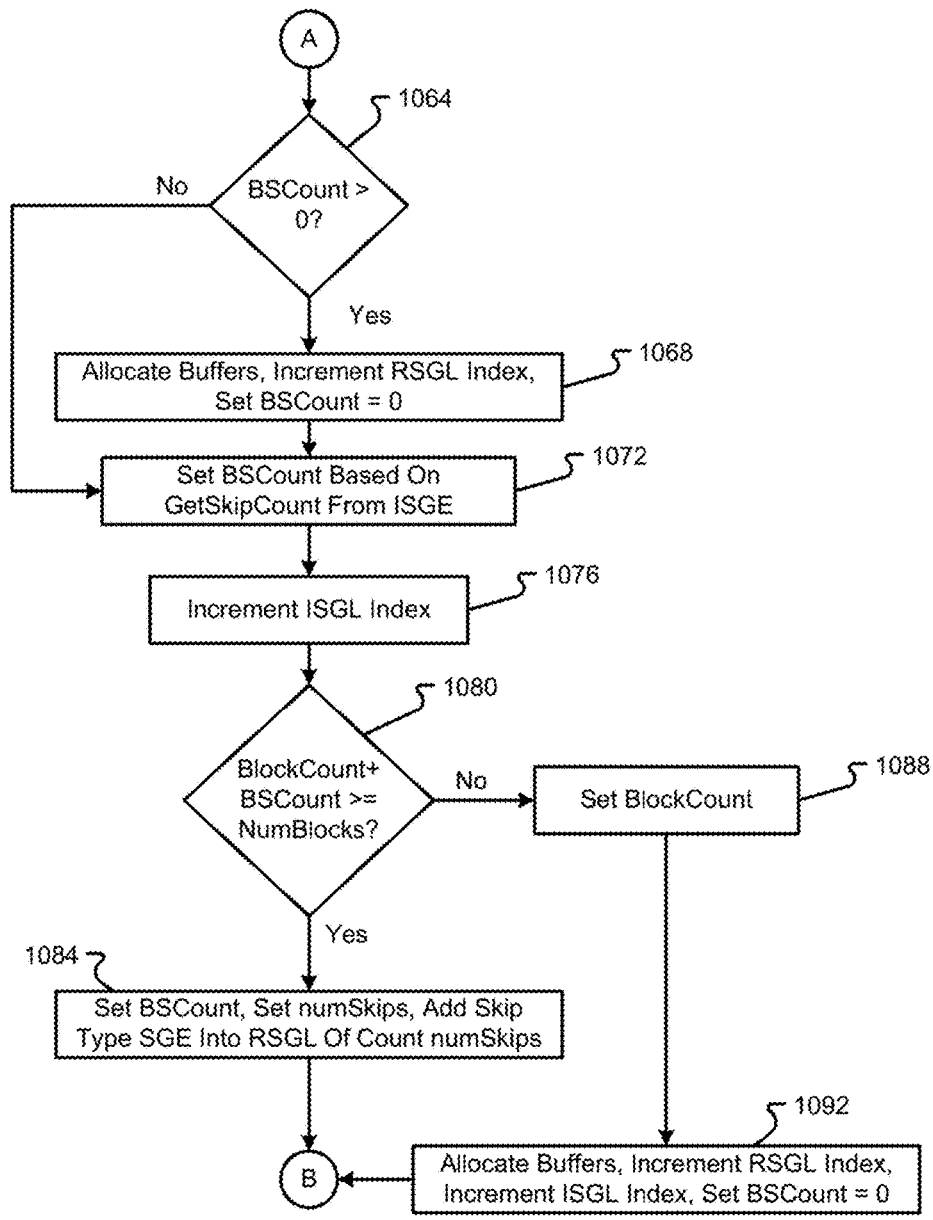
FIG. 10B is a second portion of the flow diagram in FIG. 10A.

With reference now to FIGS. 10A and 10B, a first method of allocating alias buffers will be described in accordance with at least some embodiments of the present disclosure. The first method of allocating alias buffers correspond to a buffer allocation method that follows a RMW process. It should be noted that some or all of the steps depicted and described in connection with FIGS. 10A and 10B may be performed by the RAID manager 256 and/or SAS manager 260. Furthermore, in some embodiments, the allocation of alias buffers is performed to enable the creation of dirty arms. An RSGL is allocated to store the alias buffers allocated to read the old data from the drives for the dirty arms as well as parity arm. For each dirty arm, an alias arm (notional) can be used, buffers are allocated to the alias arm. The buffers may be allocated such that when the ISGL contains a buffer, then the corresponding buffer in the RSGL is a filler buffer and if the ISGL contains a skip, then it would be a non-filler buffer. Such a non-filler buffer may be replaced with the skips in the ISGL. It should also be noted that while populating the ISGL, provision can be made to leave enough ISGEs to accommodate the replaced buffers by inserting dummy ISGEs as required.

In some embodiments, buffers for the parity are allocated from the rowMin to rowMax (e.g., the entire region covered by the flush). The flush LMID may then be filled with the RSGL and RSGLoffset for each of the arms in the following order: dirty arms, alias arms, and parity arms. The flush LMID may also have its parityarmindex to provide the index of the parity arm. After the buffers are allocated, reads may be issued to read into all buffers. After the reads are completed, an XOR may be performed on the dirty arms, alias, and parity arms with an option of skipping the fillers. Once the XOR is completed, the RSGL may be freed and the non-filler buffers may also be freed. The ISGL may be updated with "Write In Progress" signature and the write I/Os may be issued for the data and parity. Thereafter, all remaining alias buffers may be freed along with the flush LMID.

The method begins by setting the blockcount equal to the number of leading skips in the arm as identified during a parsing of the ISGL (step 1004). Then the skiptype SGE is added to the RSGL with a count equaling the number of blocks identified as blockcount in step 1004. The ISGL may also be incremented (step 1008).

Thereafter, the number of blocks, numblocks, is set (step 1012) and the next ISGE is obtained (step 1016). The method continues with the RAID manager 256 determining if the next ISGE contains a cache segment, missing arm, or terminator (step 1020). If the answer to this query is yes, then the buffer segment count BSCount is set to the numblocks minus the blockcount (step 1056). The method then proceeds by determining if the current BSCount is greater than zero (step 1048). If not, then the method ends (step 1060). If so, then buffers are allocated from a large buffer, the RSGL index is incremented, the ISGL index is incremented, and the BSCount is set to zero (step 1052). In this step, the number of buffers that are allocated may correspond to the same number as identified by the BSCount. Furthermore, the BSID for the buffers may be added to the RSGL and the SGE may be marked as an outer filler type of SGE.

Referring back to step 1020, if the answer to the query is no, then the method continues by determining if the ISGE is a buffer segment type of ISGE (step 1024). If this query is answered positively, then the method proceeds by setting the BSCount equal to the previous BSCount value plus one (e.g., incrementing the BSCount), setting the blockcount equal to the previous block count plus one (e.g., incrementing the blockcount), and incrementing the ISGL index (step 1028). Thereafter, the RAID manager 256 determines if the BSCount equals the large buffer size (step 1032). If not, then the method returns to step 1016. If so, then the RAID manager 256 allocates a large buffer and adds the BSID to the RSGL. The RAID manager 256 may also mark the SGE as an outer filler type of SGE (step 1036). Thereafter, the RAID manager 256 may also increment the RSGL index and set the BSCount equal to zero (step 1040). The determination is then made as to whether or not the current blockcount is greater than or equal to the numblocks (step 1044). If not, then the method returns to step 1016. If so, then the method continues to step 1048.

Referring back to step 1024, if the ISGE is determined to be of a buffer segment type, then the method continues by determining if the current BSCount is greater than zero (step 1064). If this is answered affirmatively, then buffers are allocated, the RSGL index is incremented, and the BSCount is set to zero (step 1068). In this step, the number of buffers allocated from the large buffer may correspond to a BSCount number of buffers. Moreover, the BSID for the buffers may be added to the RSGL and the SGE may be marked as an outer filler-type of SGE.

Thereafter, or in the event that step 1064 was answered negatively, the method continues by setting the BSCount based on the GetSkipCount from the ISGE (step 1072). As can be appreciated, this information may be maintained as a parameter of the ISGE and may be referenced by the RAID manager 256 at any point during its life. The method then continues by incrementing the ISGL index (step 1076) and then determining if the blockcount plus the BSCount is greater than the numblocks (step 1080). If this answered positively, then the BSCount is set to zero, the number of skips (numSkips) is set equal to the numblocks minus the blockcount, and a skip-type SGE is added into the RSGL (step 1084). Thereafter, the method ends (step 1060).

Referring back to step 1080, if the query is answered negatively, then the blockcount is set equal to the current blockcount plus the current BSCount (step 1088). Thereafter, buffers are allocated, the RSGL index is incremented, the ISGL index is incremented, and the BSCount is set to zero (step 1092). In this step, a BSCount number of buffers may be allocated from the large buffer and the BSID may be added to the RSGL. Moreover, the SGE may be marked as an inner filler-type of SGE. Thereafter, the method ends (step 1060).

Figure 11A:
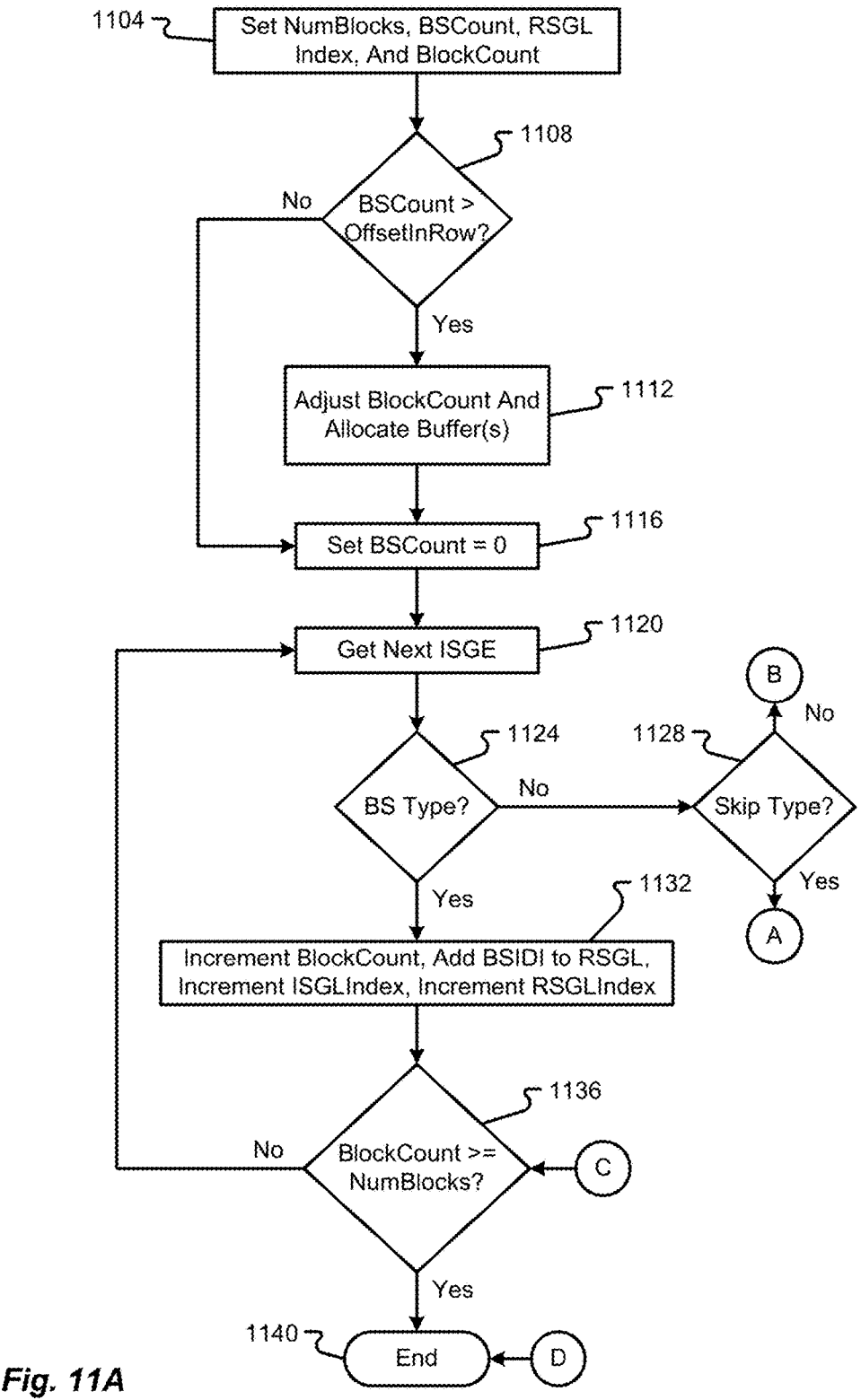
FIG. 11A is a first portion of a flow diagram depicting a second method of allocating alias buffer in accordance with embodiments of the present disclosure.
Figure 11B:
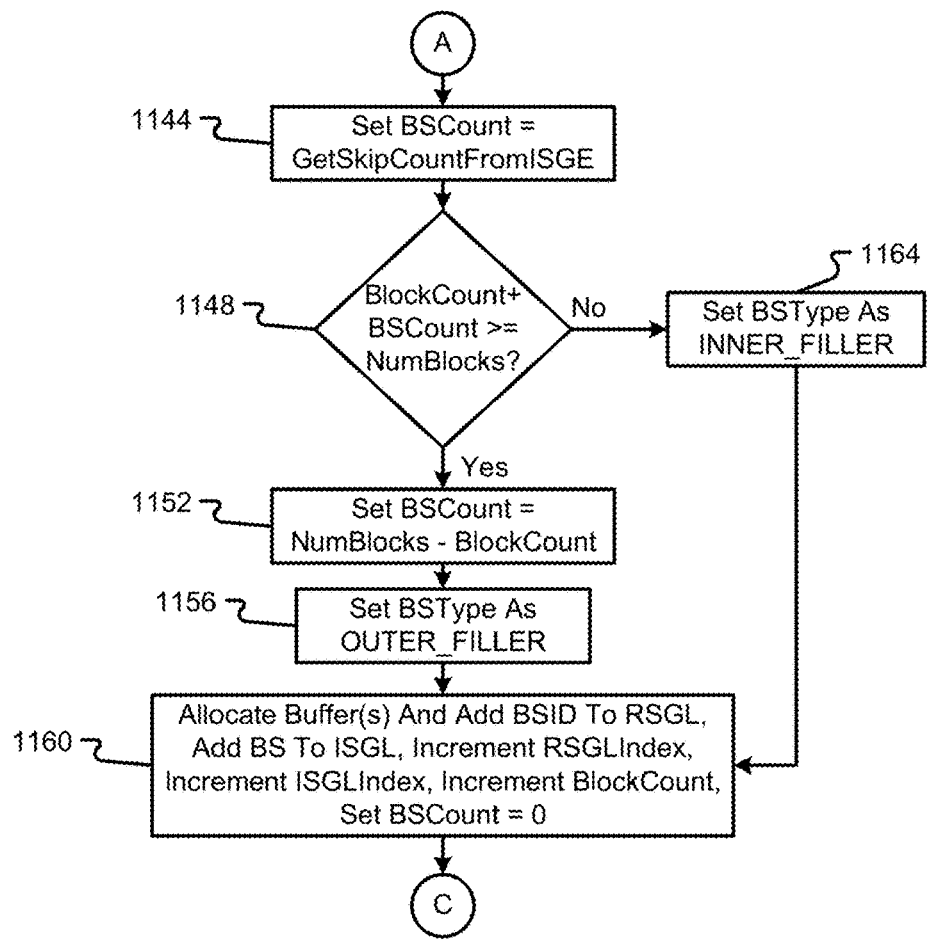
FIG. 11B is a second portion of the flow diagram in FIG. 11A.
Figure 11C:
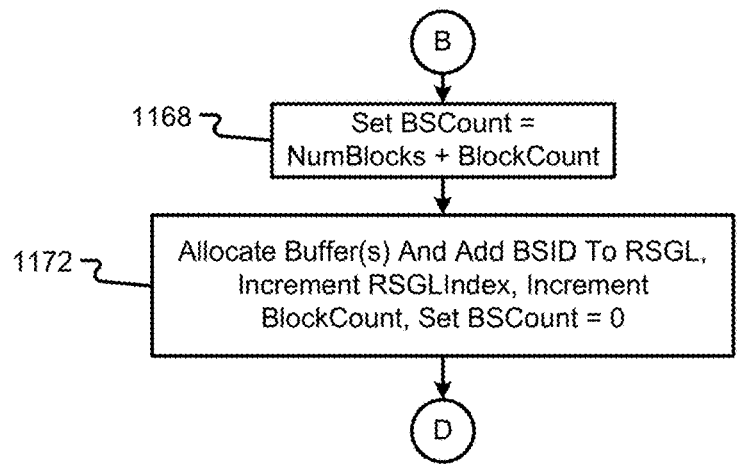
FIG. 11C is a third portion of the flow diagram in FIG. 11A.

With reference now to FIGS. 11A-C a second method of allocating alias buffers will be described in accordance with at least some embodiments of the present disclosure. The second method of allocating alias buffers correspond to a buffer allocation method that follows a read peers process. It should be noted that some or all of the steps depicted and described in connection with FIGS. 11A-C may be performed by the RAID manager 256 and/or SAS manager 260. Furthermore, in some embodiments, an RSGL is allocated to store the alias buffers allocated to read the missing data from the drives for the dirty arms. Buffers are allocated such that, when the ISGL contains a buffer, the same buffer ID is copied to the RSGL, such a buffer is marked as Dirty BS type and if ISGL contained a skip, then for all the contiguous skips corresponding buffers are allocated from large buffer pool. This may result in an allocation of a outer filler or inner filler type of buffer. Such a buffer is replaced with the skips identified in the ISGL. It should be noted that while populating the ISGL, provision was made to leave enough ISGEs for accommodating the replaced buffers and inserting dummy ISGEs where required.

Buffers may also be allocated from rowMin to rowMax (e.g., the entire region covered by flush) for the peer arms into RSGLs (e.g., arms which have cache miss) and the parity arm into the ISGL. The buffer for the peer arms will be marked as outer filler type. The buffers for the parity arm will be of inner filler type. In some embodiments, for each dirty arm, an alias arm (notional) is used, buffers are allocated to the alias arm.

After the buffers are allocated, reads may be issued to read with the read filler option. After the reads are completed, an XOR is performed on all the arms, dirty, alias and parity arms with an option no skip fillers. After the XOR is done, the RSGL and outer-filler buffers may be freed and the ISGL "Write In Progress" signature may be set. Thereafter, appropriate write I/Os are issued for the data and parity. Then all of the remaining inner filler buffers, ISGLs and the flush LMID are freed.

The method begins by setting the numblocks, BSCount, RSGL index, and blockcount (step 1104). In some embodiments, the numblocks is set equal to the numblocks identified in the flush LMID. The BSCount is set equal to the number of leading skips in the ISGL for the current arm. The RSGL index is set equal to the current index of the RSGL. The blockcount may be initially set to zero.

The method continues by determining if the BSCount is greater than the OffsetInRow value (step 1108). If this query is answered affirmatively, then the blockcount is adjusted and buffers are allocated (step 1112). The blockcount may be adjusted to equal the BSCount minus the OffsetInRow value identified in the flush LMID. Moreover, the number of buffers allocated in this step may correspond to a BSCount number of buffers and the buffers may be allocated from the large buffer pool. The BSID for the allocated buffers may be added to the RSGL and marked as outer filler buffers.

Thereafter, or in the event that the query of step 1108 was answered negatively, the method continues by setting the BSCount value to zero (step 1116). Thereafter, the next ISGE is obtained (step 1120). This is followed by determining if the obtained ISGE is a buffer segment type of ISGE (step 1124). If so, then the blockcount is incremented, the BSID for the ISGE is added to the RSGL and marked as a dirty buffer segment type, the ISGL index is incremented, and the RSGL index is incremented (step 1132). Thereafter, the method continues with the RAID manager 256 determining if the blockcount is greater than or equal to the numblocks (step 1136). If this query is answered affirmatively, then the method ends (step 1140). If this query is answered negatively, then the method returns to step 1120 and a new ISGE is obtained.

Referring back to step 1124, if the ISGE is not of a BS type, then the method continues by determining if the ISGE is of a skip type (step 1128). If not, then the method continues (FIG. 11B) by setting the BSCount equal to the GetSkipCount value identified in the ISGE (step 1144). Thereafter, the RAID manager 256 determines if the blockcount plus the BSCount is greater than or equal to the numblocks (step 1148). If this query is answered affirmatively, then the BSCount is set equal to the numblocks minus the blockcount (step 1152). The buffer segment type is then set as outer filler (step 1156). Thereafter, the appropriate (BSCount) number of buffers are allocated, the BSID(s) from those buffers are added to the RSGL, as well as into the ISGL, the RSGL index is incremented, the ISGL index is incremented, the blockcount is incremented, and the BSCount is set to zero (step 1160). In this step, the number of buffers allocated may equal the BSCount number of buffers and the buffers may be allocated from the large pool of buffers. Thereafter, the method returns to step 1136. If the query of step 1148 was answered negatively, on the other hand, then the BS type is set as an inner filler (as opposed to an outer filler) (step 1164). Then the method proceeds to step 1160.

Referring back to step 1128, if the ISGE is determined to be of a skip type, then the method continues (FIG. 11C) by setting the BSCount equal to the numblocks plus the blockcount (step 1168). Thereafter, the buffers are allocated from the large buffer pool and the BSIDs of the allocated buffers are added to the RSGL. The RSGL index is incremented, the blockcount is incremented, and the BSCount is set to zero (step 1172). Thereafter, the method ends (step 1140).

Figure 12:
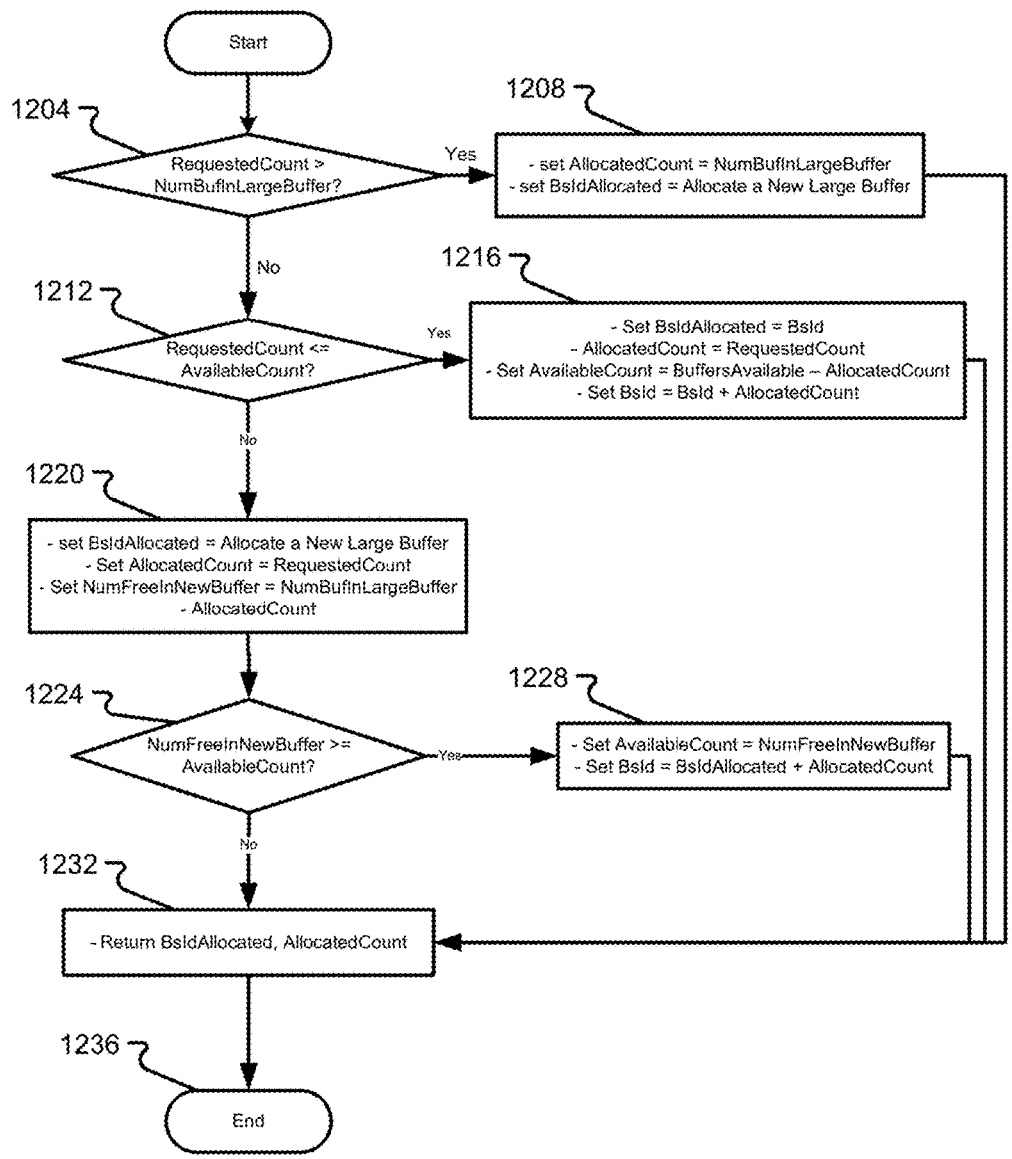
FIG. 12 is a flow diagram depicting a method of allocating large buffers in accordance with embodiments of the present disclosure.

With reference now to FIG. 12, a method of allocating buffers from a large buffer pool will be described in accordance with at least some embodiments of the present disclosure. The following method may be performed by the buffer manager 248 or any other module in memory 208. The method begins by determining if the requested number of buffers (e.g., RequestedCount) is larger than the number of buffers in the large buffer (step 1204). If this query is answered affirmatively, then allocate a new large buffer, set allocated BSID to the BSID of the newly allocated buffer, the allocated count is set equal to the number of buffers in the large buffer (step 1208) and then an allocated BSID and allocated count are returned (step 1232). The method then ends (step 1236).

If, however, the requested count is not larger than the number of buffers in the large buffer, then the method continues by determining if the requested count is less than or equal to the available count (e.g., the number of buffers currently available for allocation) (step 1212). If this query is answered affirmatively, then the method proceeds by setting the BSID allocated equal to the BSID, setting the allocated count equal to the requested count, setting the available count equal to the number of buffers available less the allocated count, and setting the BSID equal to the previous BSID plus the allocated count (step 1216). The method then proceeds to step 1232.

If the query of step 1212 is answered negatively, then the method proceeds by setting the BSID allocated equal to a newly-allocated large buffer, setting the allocated count equal to the requested count, and setting the number of free buffers in the new buffer equal to the total number of buffers in the large buffer less the allocated count (step 1220).

Thereafter, the method proceeds by determining if the number of free buffers in the new buffer is greater than or equal to the available count (step 1224). If this query is answered affirmatively, then the available count is set equal to the number of free buffers in the new buffer and the BSID is set equal to the BSID allocated plus the allocated count (step 1228). If the query of step 1224 is answered negatively, then the method proceeds directly to step 1232 without first going through step 1228. After processing step 1232 (e.g., returning the BSID allocated and allocated count), the method ends (step 1236).

Figure 13A:
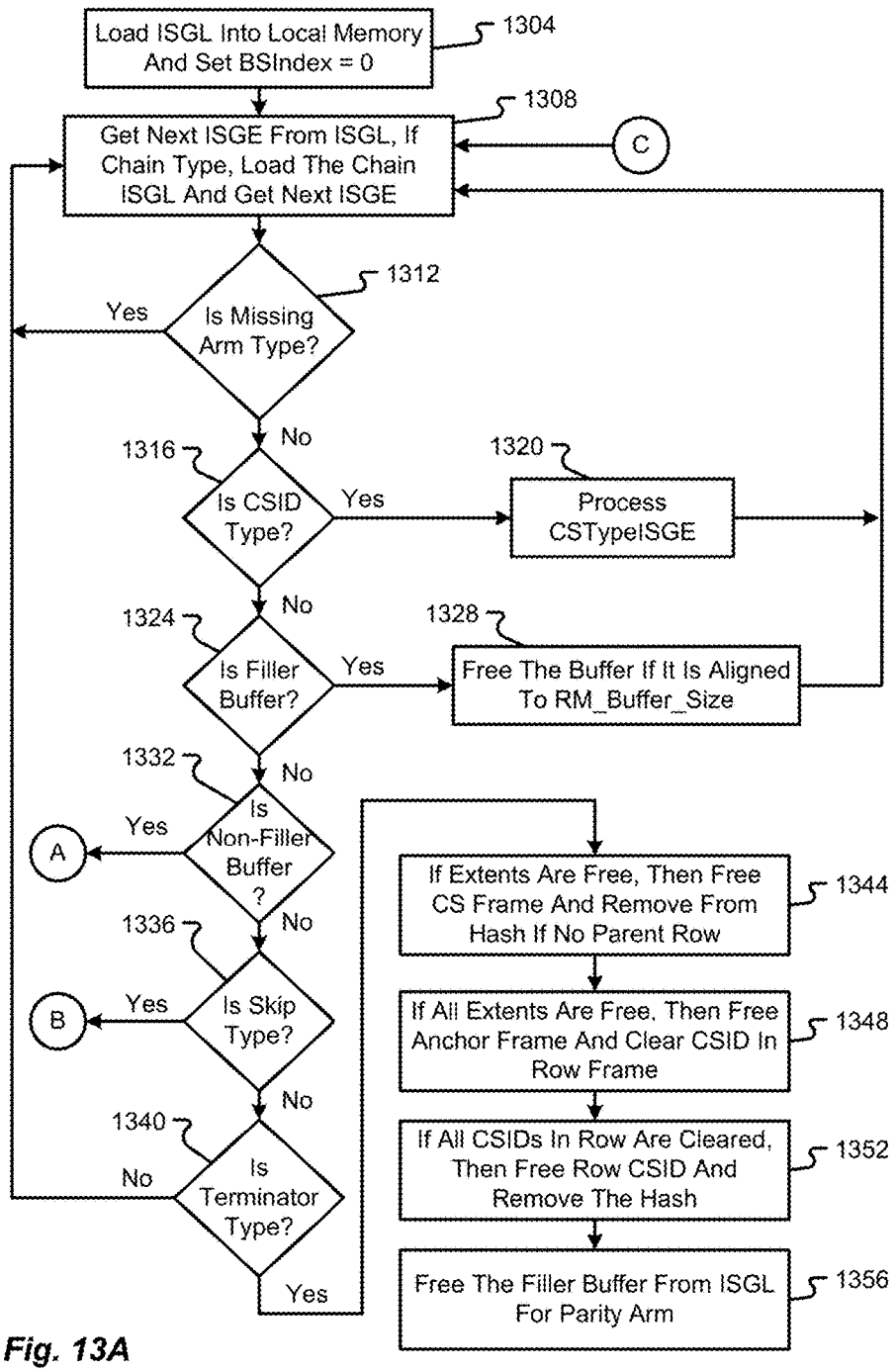
FIG. 13A is a first portion of a flow diagram depicting a method of performing a cache update process in accordance with embodiments of the present disclosure.
Figure 13B:
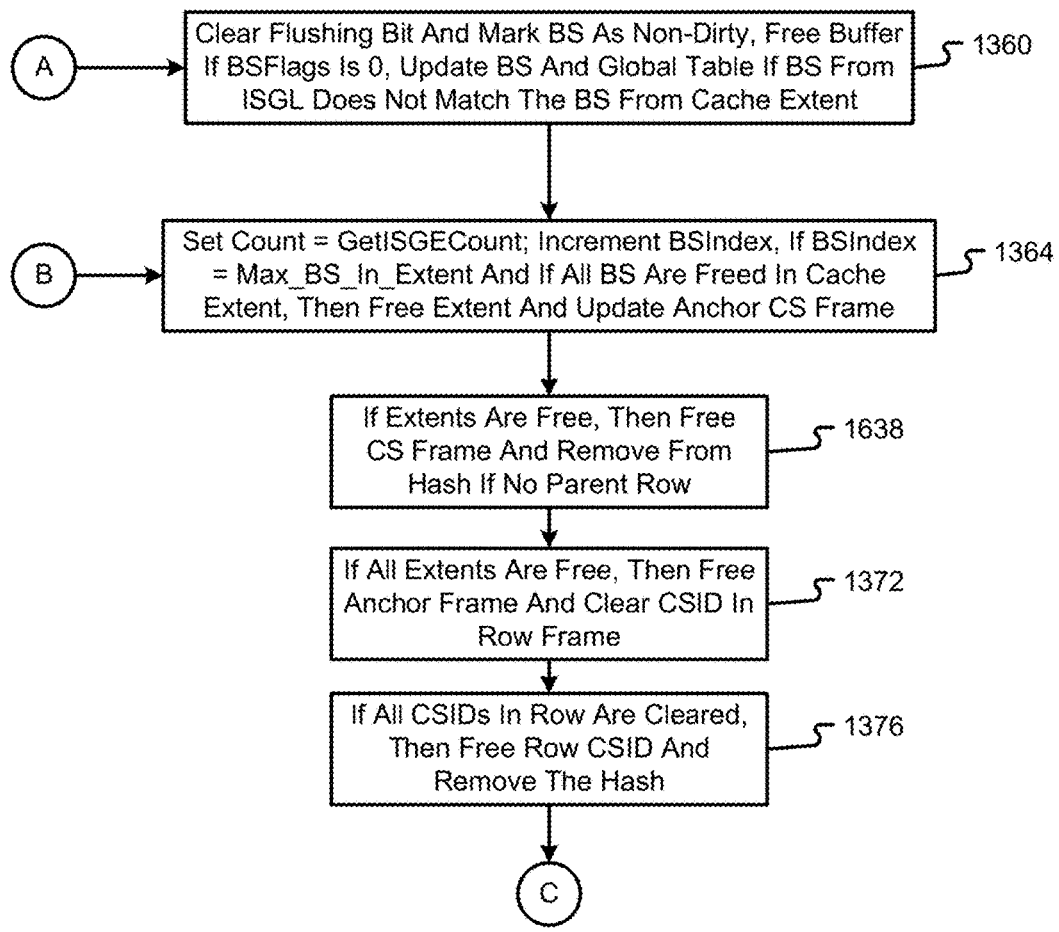
FIG. 13B is a second portion of the flow diagram in FIG. 13A.

With reference now to FIGS. 13A and 13B, a method of performing a cache update will be described in accordance with at least some embodiments of the present disclosure. The disclosed method may be performed by the cache manager 252 or any other memory 208 module depicted and described herein. During this cache update process, a clear "Write In Progress" signature from CSID may be used to indicate that writes to the drives are completed.

When a CSID is encountered in the ISGL if the previous CSID that was being worked upon was not cleaned up, then it is cleaned up. Check if all the extents are freed, and if all the extents are freed, the CSID is also freed. The method will also check if it has a parent row, in which case, remove the reference to this CSID into the parent row. The cache manager 252 may also check if the parent row does not have any more CSID present (e.g., all the arms CSIDs are cleaned up). If so, the row is removed. In both the cases, the CSID from the hash is removed. If the CSID cannot be freed then it is updated back to DRAM. Next the new CSID is loaded to local memory 208 and the cache manager 252 moves on to the next ISGE.

When an inner filler buffer is encountered it is freed. If it is of type dirty buffer, the cache manager 252 may check if the same BSID is present in the cache segment extent. If yes, then clear the flushing flag, check if the flags field is set to 0. If the flags field is set to 0 the BSID is freed and update the extent section, otherwise it cannot be freed and the flags are updated back in the extent section. If the BSID is not same as that present in the extent section, then the flushing bit is cleared in the globalBSTable. If globalBSTable[BSID].flags is 0 then the BSID is freed.

In this process, if an entire extent is freed then the extent is also cleared from the cache segment anchor. And if it is observed that two extents that are being shared by a CS are freed then the corresponding CSID is also freed.

When all the extents in the CS are freed then as described above. The CS is also cleaned up. At the end of the row processing if the row/strip CS is not freed, the cache manager 252 will check if the overwritten flag is set to 1. If yes, then add the Row/Strip CS to dirty List Additional details of a cache update process used to achieve the above will now be described. The method begins with the cache manager 252 loading the ISGL into local memory and setting the BSindex to zero (step 1304). The cache manager 252 then obtains the next ISGE from the ISGL (step 1308). If the ISGL is of a chain type, then the next ISGL in the chain is loaded and the next ISGE is obtained from that ISGL.

Thereafter, the cache manager 252 determines if the newly-obtained ISGE is of a missing arm type (step 1312). If yes, then the method returns to step 1308. If not, then the method proceeds with the cache manager 252 determining if the ISGE is of a CSID type (step 1316). If so, then the CStype ISGE is processed as described above (step 1320).

If the query of step 1316 is answered negatively, then the cache manager 252 determines if the ISGE is a filler buffer type (step 1324). If so, then the buffer is freed as long as the filler buffer aligns with an appropriately and predetermined size of filler buffer (step 1328). Thereafter, the method returns to step 1308.

If the query of step 1324 is answered negatively, then the method continues with the cache manager 252 determining if the ISGE is a non-filler buffer type (step 1332). If this query is answered affirmatively, then the cache manager 252 continues (FIG. 13B) by clearing the flushing bit and marking the buffer segment as a non-dirty segment. The buffer is then freed and if the BSflags is zero, the BS is updated in the global BS table. This all occurs as long as the ISGL does not match the BS from the cache extent (step 1360).

Referring back to step 1332, if this query is answered negatively, then the cache manager 252 determines if the ISGE is a skip type (step 1336). If so, or after the processing at step 1360, the method continues by setting the count equal to the count that is present in ISGE (step 1364). This step also increments the BS index if the BS index is equal to the maximum number of buffer segments in the extent and if all BS are freed in the cache extent. If this is true, then the extent is freed and the cache frame anchor 228 is updated accordingly (step 1364). Thereafter, the CS frame is freed and removed from the hash if there is no parent row and if all of its extents are freed (step 1368). If all of the extents are freed, then the cache frame anchor 228 is freed and the corresponding CSID is cleared in the row frame (step 1372). If all of the CSIDs in the row are cleared, then the row CSID is freed and removed from the hash (step 1376). Thereafter, the method returns to step 1308.

Referring back to step 1336, if the query of this step is answered negatively, then the method continues with the cache manager 252 determining if the ISGE is of a terminator type (step 1340). If not, then the method returns to step 1308. If so, then the cache manager 252 determines if all of the extents are freed. If so, then the cache segment frame is freed and removed from the hash as long as there are no parent rows (step 1344). If all extents are free, then the cache frame anchor 228 is freed and the corresponding CSID is cleared in the row frame (step 1348). If all of the CSIDs in the row are cleared, then the row CSID is freed and removed from the hash (step 1352). Thereafter, the filler buffers are freed from the ISGL for the parity arm (step 1356).

Figure 14:
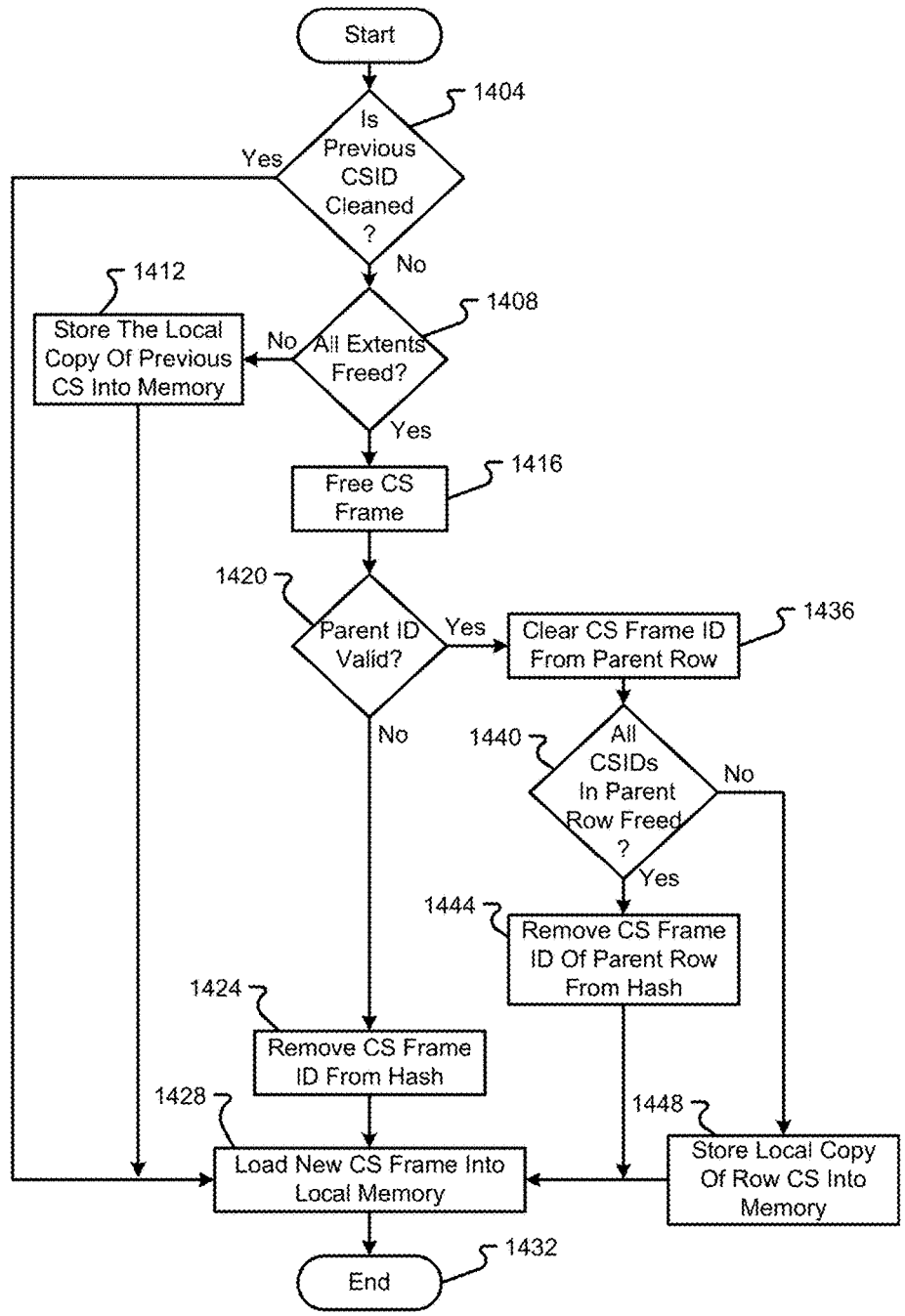
FIG. 14 is a flow diagram depicting a method of processing a cache segment type ISGE in accordance with embodiments of the present disclosure.

With reference now to FIG. 14, a method of processing a CS-type ISGE will be described in accordance with at least some embodiments of the present disclosure. The following method may be performed by the cache manager 252 or any other memory 208 module depicted and described herein.

The method begins by determining, for a current CS, whether the previous CSID has already been cleaned (step 1404). If this query is answered affirmatively, then the new CS frame is loaded into local memory 208 (step 1428). Then the method ends (step 1432).

If, however, the previous CSID has not yet been cleaned as determined in step 1404, then the method continues by determining if all extents in the CS have been freed (step 1408). If this query is answered negatively, then a local copy of the previous CS is stored into memory 208 (step 1412). The method then continues to step 1428. On the other hand, if all extents have been freed, then the CS frame is freed (step 1416). The cache manager 252 then determines if the parent ID is valid (step 1420). If the parent ID is not valid, then the CS frame ID is removed from the hash (step 1424)

If the parent ID is valid, then the CS frame ID is cleared from the parent row (step 1436). Then the cache manager 252 determines if all of the CSIDs in the parent row have been freed (step 1440). If so, then the CSIDs and the CS frame ID of the parent row is removed from the hash (step 1444). If all of the CSIDs in the parent row have not been freed, then a local copy of the row CS is stored into local memory 208 (step 1448).

Figure 15:
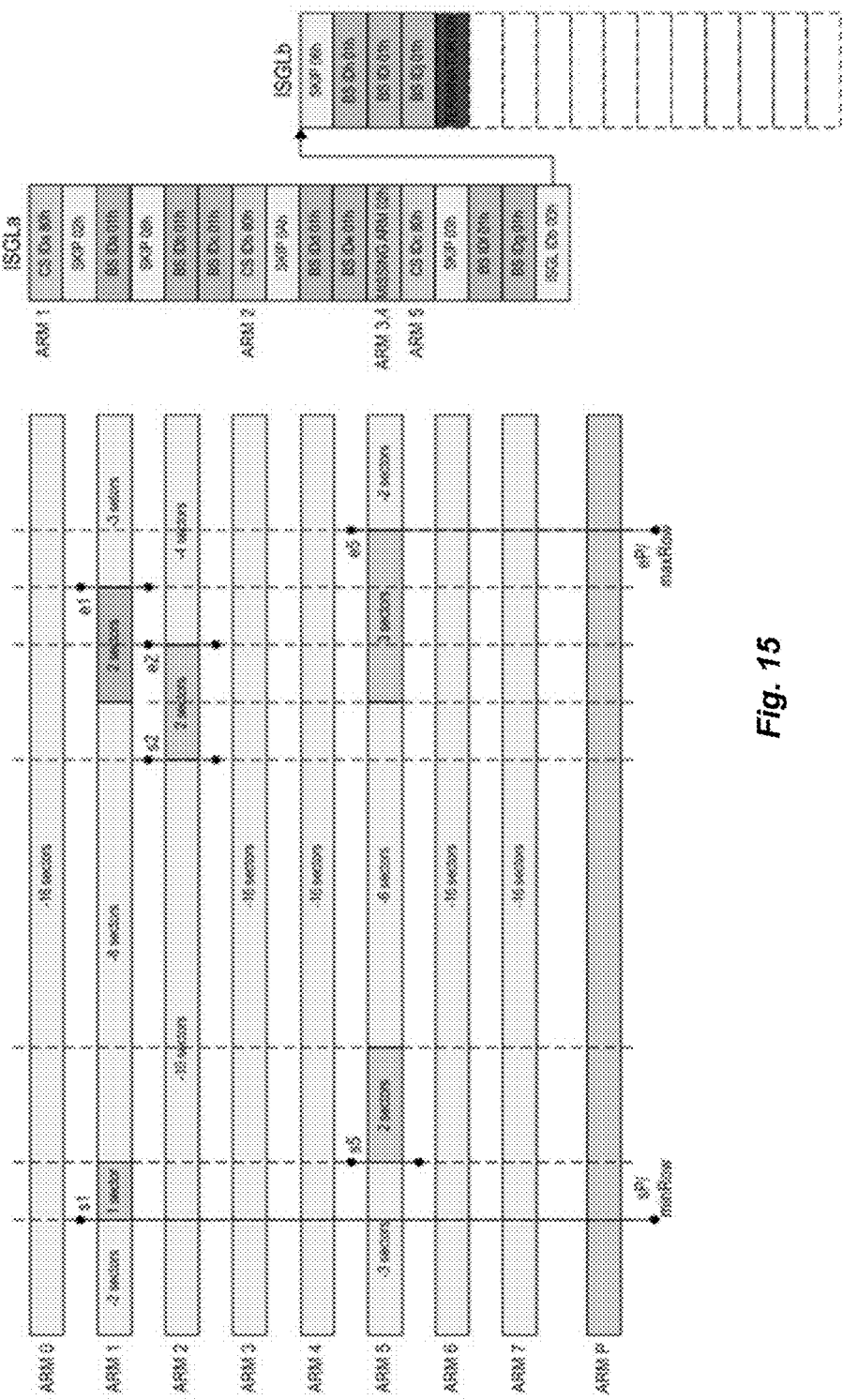
FIG. 15 is a diagram depicting a process for generating a cache flush ISGL in accordance with embodiments of the present disclosure.
Figure 16:
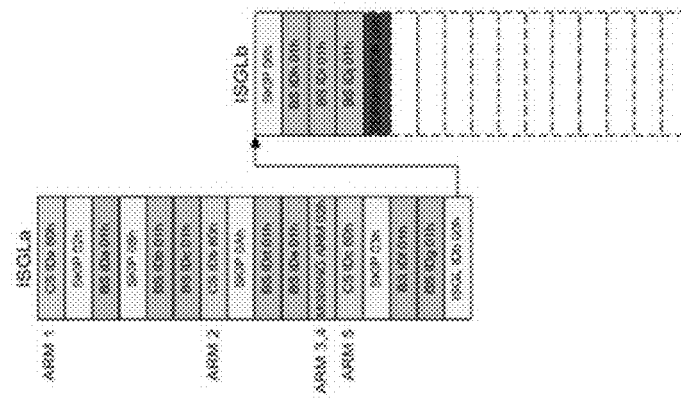
FIG. 16 is a diagram depicting a process for generating a cache flush request in accordance with embodiments of the present disclosure.
Figure 17:
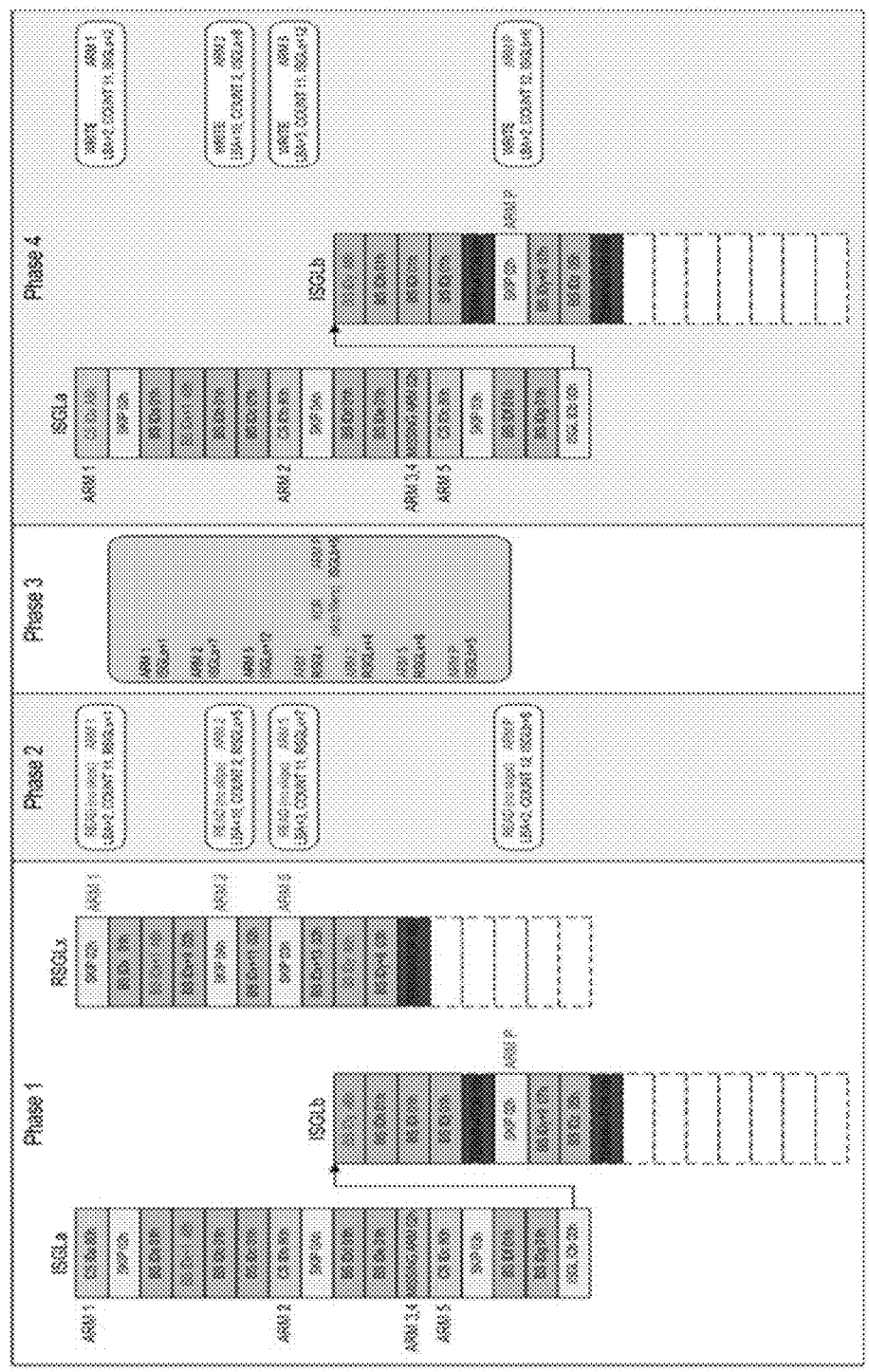
FIG. 17 is a block diagram depicting the generation of a cache flush request data structure in accordance with embodiments of the present disclosure.

With reference now to FIGS. 15-17, a non-limiting example of generating a cache flush ISGL will be described in accordance with at least some embodiments of the present disclosure. This particular example is one in which a read modify write (RMW) process is employed. As can be seen, the ISGL describes the row from the first dirty arm to the last dirty arm. Each arm is described beginning with the first sector of the arm, but missing trailing sectors can be ignored. A large inner gap should be described by one non-zero count SKIP SGE followed by multiple zero-count SGEs since the RAID manager 256 may fill in the gap and it utilizes one SGE for each buffer chunk used for this purpose. The TERMINATOR SGE is used to mark the end of the ISGL chain.

In the depicted example, the ISGL chain includes a first ISGL (e.g., ISGLa) and a second ISGL (e.g., ISGLb). The second ISGL is at the end of the ISGL chain, hence it includes the TERMINATOR SGE. The first ISGL is shown to have a plurality of ISGEs describing information for a row of dirty arms (e.g., ARM1, ARM2, ARM3, ARM4, and ARM5). Each SGE for an arm may include a CSID and a BSID associated therewith. As can be seen, some arms may not have a CSID or BSID, but rather may be of a missing arm type, in which case a missing arm SGE is used in the ISGL. The last arm (e.g., ARM5) is shown to span between the first ISGL and second ISGL, which means that the last SGE in the first ISGL includes an ISGL ID linking the first ISGL to the second ISGL. The first SGE in the second ISGL is shown to be of a skip type SGE. The following SGEs are shown to be of a BS type.

The example is continued in FIG. 16 along with a corresponding flush LMID that is used to generate an appropriate cache flush request. As can be seen in FIG. 16, the ISGL ID of the first ISGL is stored into the flush LMID and is the first frame in the ISGL chain that describes the row to be flush from the first to the last dirty arm. The minRow is stored into the Offset In Row Field, while the delta between the minRow and maxRow is stored in the Number of Blocks field. Furthermore, the flush LMID can store the SGL frame IDs and the starting offsets into SGLs for up to twelve arms (or more if extension LMIDs are used). As a non-limiting example, if extension LMIDs are used, then up to 32 arms may have their SGL frame IDs and starting offsets associated therewith stored in the flush LMID. Although the example values of twelve and thirty two arms are shown, it should be appreciated that the LMID and extension LMIDs may be modified to accommodate a greater or lesser number of arms without departing from the scope of the present disclosure.

In the depicted example, the dirty arms occupy, in increasing logical number order, the first successive SGL locations. Additional arms (e.g., P, Q, and R) arms are also consecutive, with P being the first and occupying the location indicated by ARM P slot field. The example is further depicted in FIG. 17 where the four phases of generating a cache flush request are depicted. In the first phase, an RSGL is built using RM buffers. Parity is added to the ISGL and inner filler buffer segments are further added to fill in the ISGL inner gaps. As the ISGL gets parsed, the "no BS skip ie. Read all" commands are issued. This results in read I/Os being generated and old data is loaded into local memory 208 for each alias arm and parity.

In phase three, an XOR process is applied where dirty arms, alias arms, and parity are XOR'd with one another. In this phase, the filler type buffer segments are skipped. This XOR process is performed starting with the first sector of each arm.

In phase four, the RSGL and outer-filler buffers are freed. The ISGL Write In Progress signature is set and one or more write I/Os are issued for the data and parity. After the writes are completed, a cache update process will free up all of the buffers and cache segments.

Figure 18:
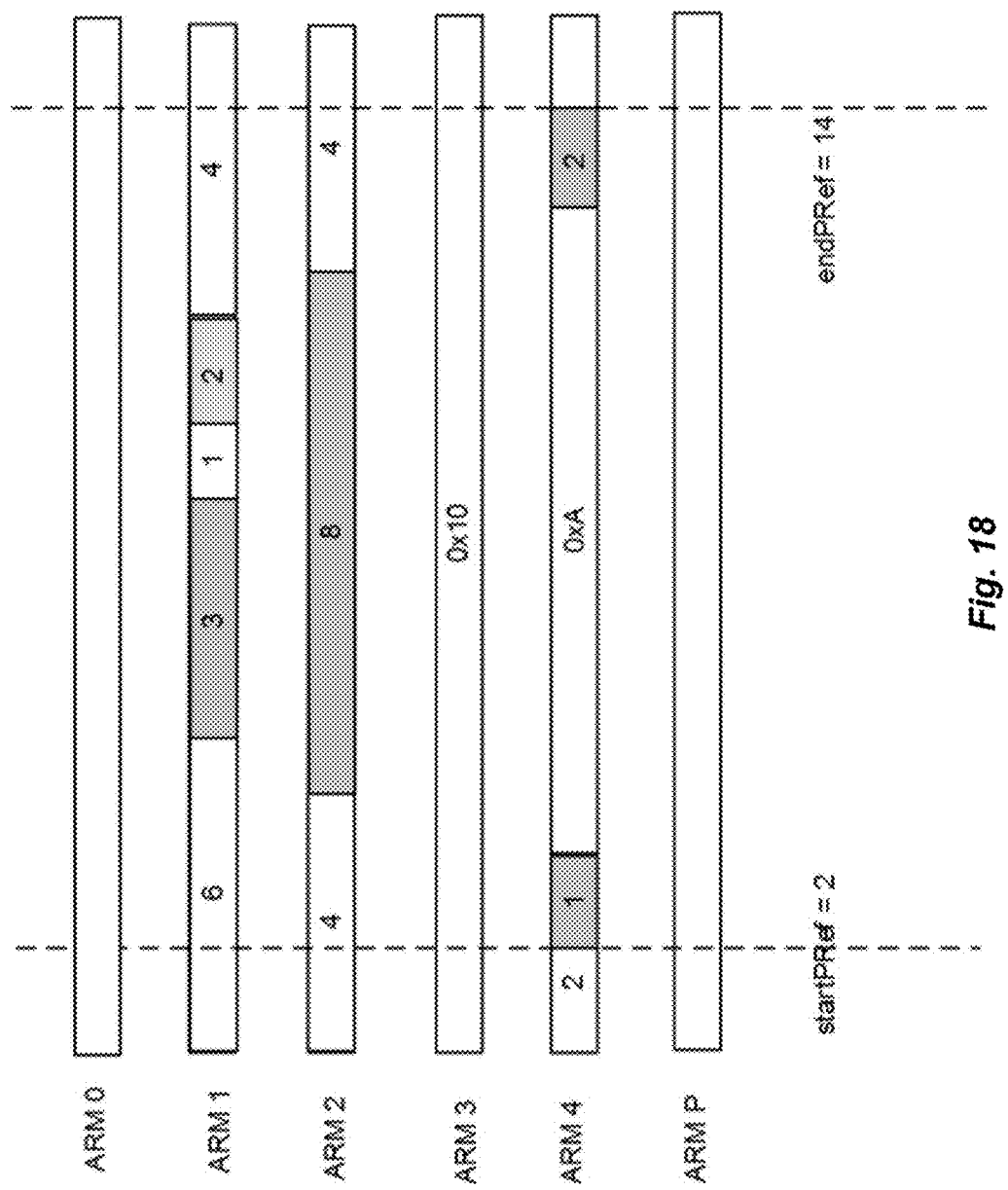
FIG. 18 is a block diagram depicting a read peers cache data layout in accordance with embodiments of the present disclosure.
Figure 19:
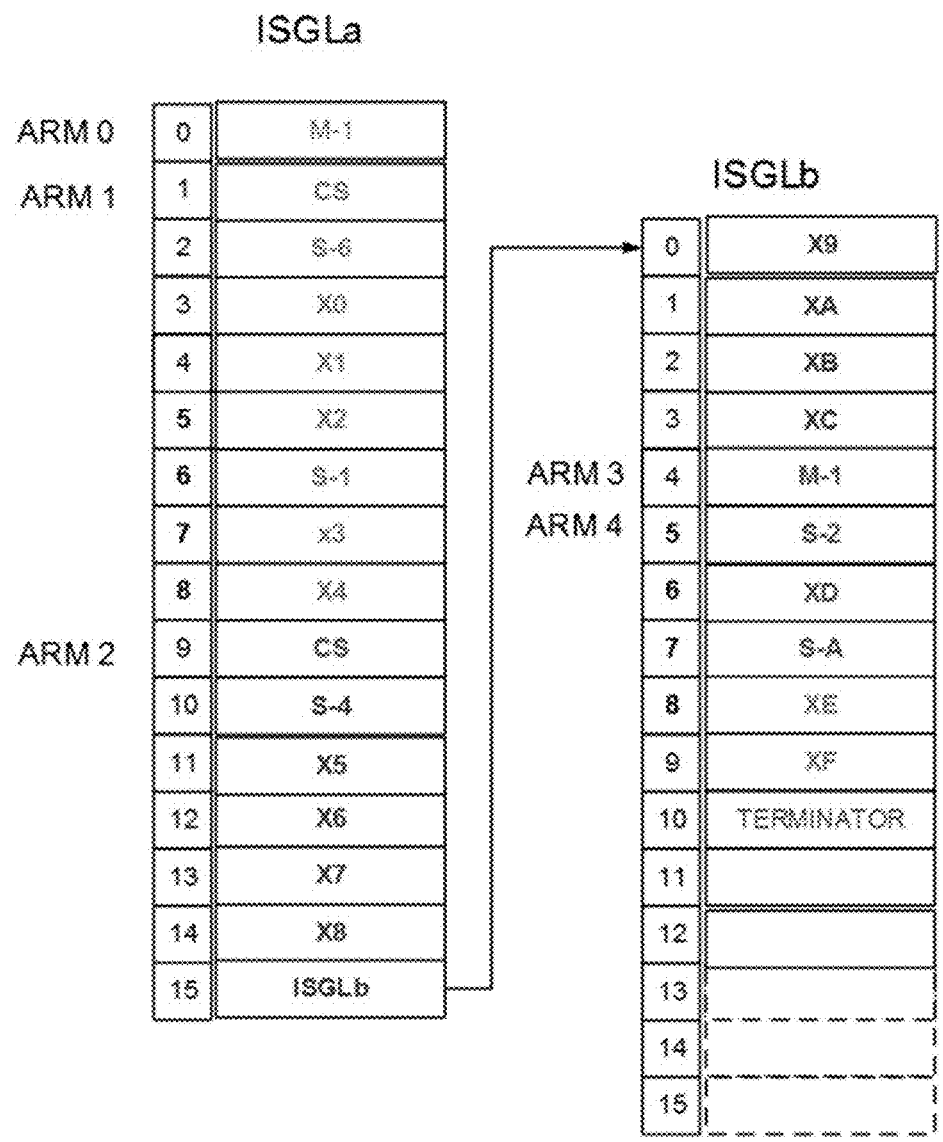
FIG. 19 is a block diagram depicting the generation of an ISGL in accordance with embodiments of the present disclosure.
Figure 20:
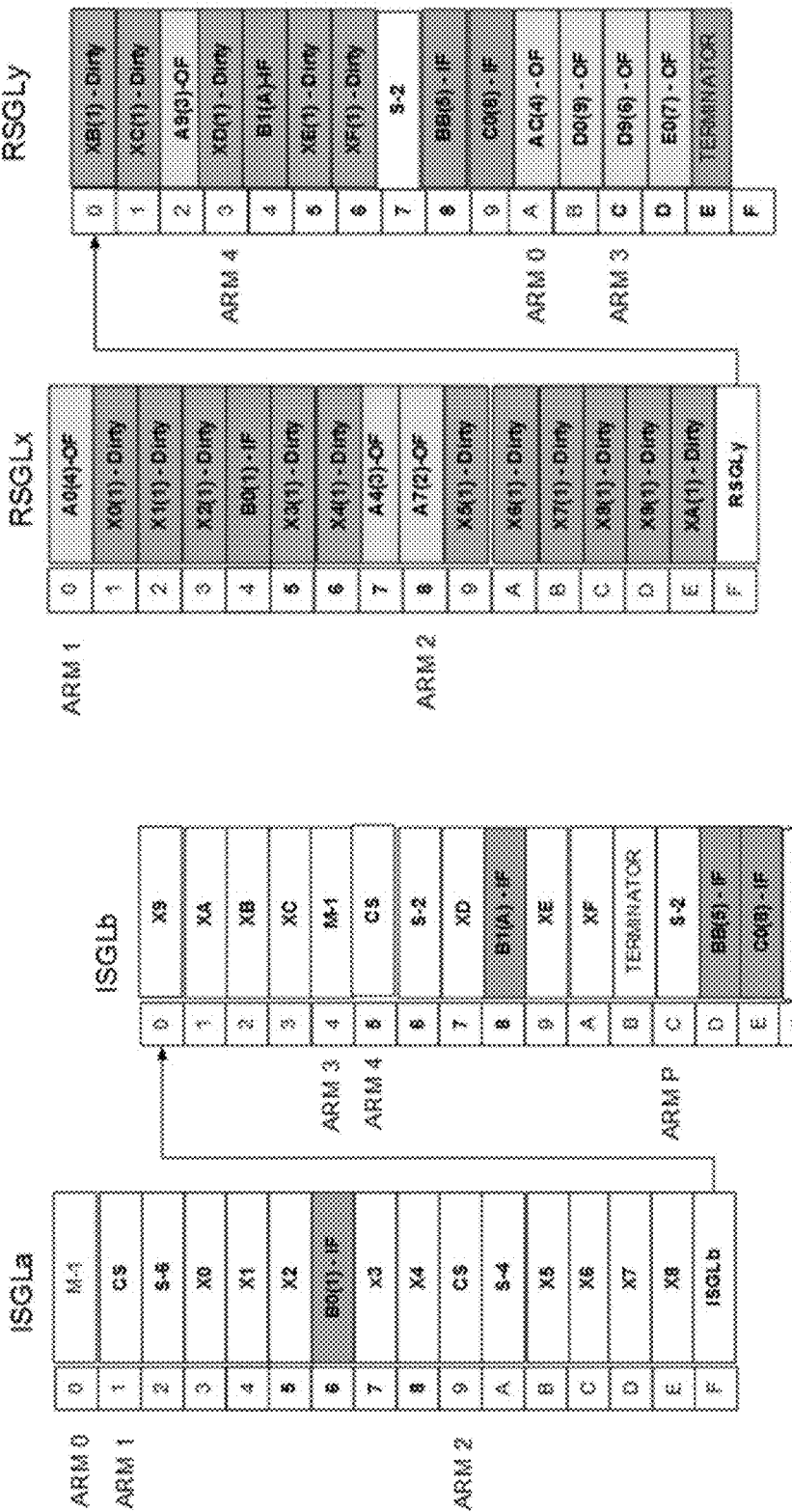
FIG. 20A is a block diagram depicting a snapshot of an ISGL after parity allocation in accordance with embodiments of the present disclosure.
FIG. 20B is a block diagram depicting a snapshot of an RSGL after allocation in accordance with embodiments of the present disclosure.

Another example of generating a cache flush using a read peers process will be described with reference to FIGS. 18-22E. It should be appreciated that this process utilizes a read peers cache data layout, an illustrative version of which is depicted in FIG. 18. The illustrative data layout used for a read peers shows the parity arms (ARM P) and other arms (e.g., ARM0, ARM1, ARM2, and ARM3) are stored starting with a startP reference equal to '2' and an endP reference equal to 14. FIG. 19 depicts a first and second ISGL (e.g., ISGLa and ISGLb) in a first phase. Specifically, this first phase corresponds to a phase in which the ISGLs are generated. As with the RMW process, the last ISGL in the ISGL chain has a terminator type SGE in its last entry. In this example the first arm (e.g., ARM 0) is shown to occupy the first SGE of the first ISGL. Each subsequent arm is shown to have a beginning SGE as either a CS type SGE or a missing type SGE.

With reference to FIGS. 20A and 20B, a first phase of the read peers process is depicted. In FIG. 20A, a snapshot of the ISGLs after parity allocation is depicted. In this portion of the process, the ISGLs are populated with a number of inner filler type buffers (e.g., B0(1)-IF, B1(A)-IF, BB(5)-IF, and C0(8)-IF). The inner filler type buffers are added to the second arm (e.g., ARM1), the fifth arm (e.g., ARM4) and the parity arm (ARM P). FIG. 20B depicts a snapshot of the RSGLs after allocation. As can be seen, the inner filler buffers occupy a number of the SGEs in the RSGLs. Moreover, a number of outer filler buffers (e.g., buffer types of "OF").

Figure 21:
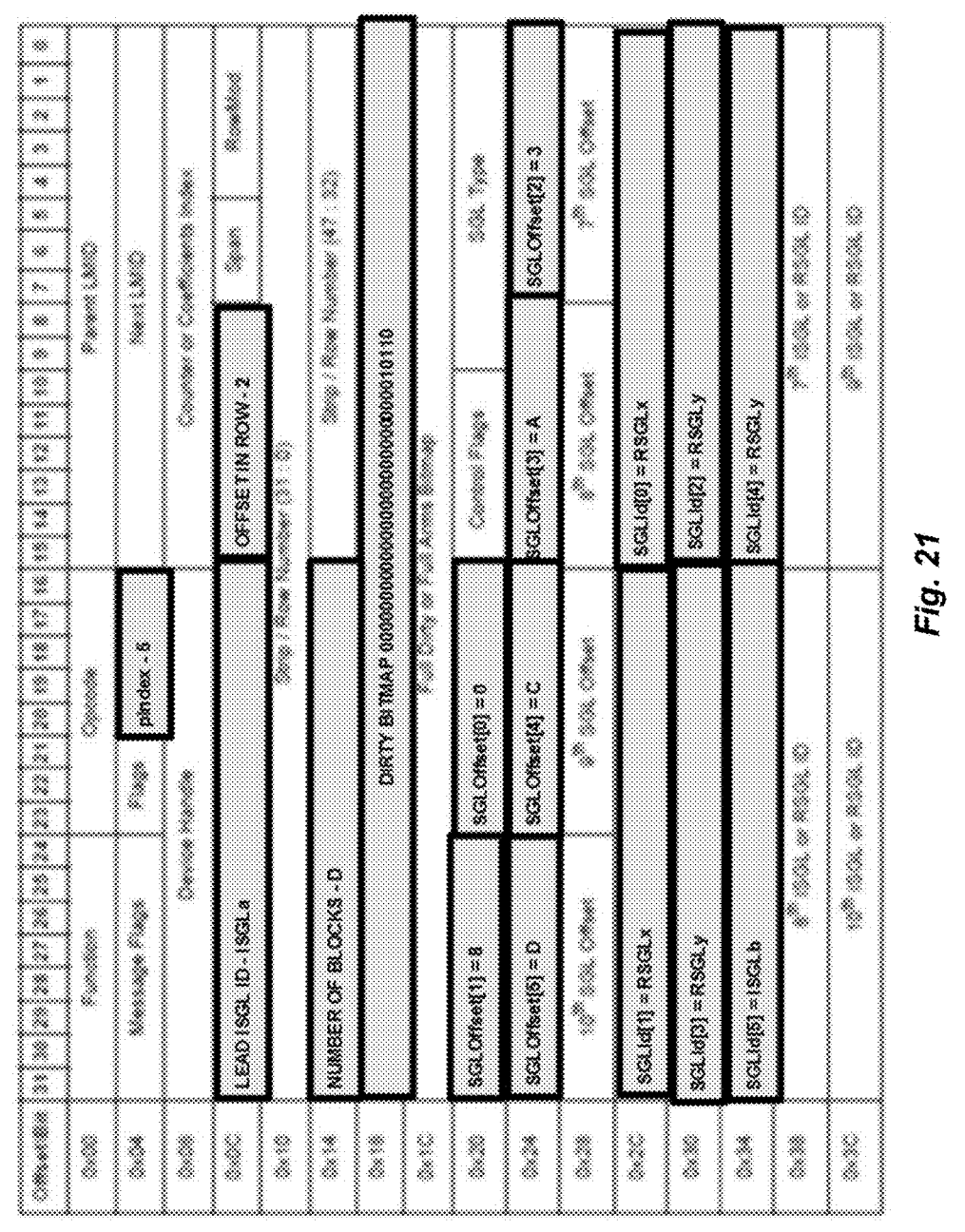

FIG. 21 depicts an example of the flush LMID after allocated (e.g., during phase 2). In this example, the flush LMID stores the ISGL ID for the first ISGL (e.g., ISGL A). The flush LMID further stores the parity index and the number of offsets in the row.

FIG. 22A depicts the read commands that are issued for each parity arm with a read filler option. In the depicted example, the first ARM (e.g., ARM0) is read from LBA 2 with an RSGL offset of A. The first ARM also identifies the numblocks to be 'D' and the RSGL ID to correspond to RSGL 'y'. Similar read commands with read filler options are shown for the other arms, including the parity arm.

FIG. 22B depicts a fourth phase where the XOR process is performed with a don't skip filler option. In this example, the arms and parity arm are left with the RSGL ID or ISGL ID, as appropriate, along with an RSGL or SGL offset, as appropriate.

FIG. 22C depicts a fifth phase where outer filler buffers and RSGLs are freed. In particular, each outer filler buffer is freed from the RSGL. This results in write command(s) being issued from the ISGLs as shown in FIG. 22D. Specifically, now only write commands are issued for the parity arm and arms not completely composed of outer filler type buffers and/or terminator type buffers (e.g., ARM1, ARM2, and ARM4). Finally, the buffers are freed and the ISGLs are updated as shown in FIG. 22E. In this particular phase, the cache is finally updated and the buffers that are present in ISGLs are freed from the Cache Segments if they are no longer in use.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for performing a cache flush, the method comprising:
    allocating one or more Internal Scatter Gather Lists (ISGLs) for the cache flush;
    populating the one or more ISGLs with Cache Segment Identifiers (CSIDs) and corresponding Buffer Segment Identifiers (BSIDs) of each strip that is identified as dirty, of a skip-type Internal Scatter Gather Element (ISGE), or of a missing arm-type ISGE;
    allocating a flush Local Message Identifier (LMID) as a message to be used in connection with processing the cache flush;
    populating the flush LMID with an identifier of the one or more ISGLs; and
    transferring the flush LMID to a cache manager module to enable the cache manager module to execute the cache flush based on information contained in the flush LMID.

2. The method of claim 1, further comprising:
    allocating one or more RSGLs and one or more temporary buffers to read missing data and/or old data in connection with executing the cache flush; and
    populating the allocated one or more RSGLs and one or more temporary buffers into the one or more ISGLs so that a single write can be issued.

3. The method of claim 2, further comprising:
    performing an XOR operation and generating one or more parity bits as a result of performing the XOR operation; and
    enabling the single write step to be issued after the XOR operation instead of multiple write steps.

4. The method of claim 2, further comprising:
    segregating the one or more temporary buffers into a first set of buffers and a second set of buffers;
    utilizing the first set of buffers for inner filler buffers; and
    utilizing the second set of buffers for outer filler buffers.

5. The method of claim 4, wherein the inner filler buffers are allocated from a different buffer pool than the outer filler buffers.

6. The method of claim 1, further comprising:
freeing up one or more temporary buffers that are not required for the cache flush; and
enabling the freed one or more temporary buffers to be used for parallel read or write commands that utilize a strip or row assigned to the one or more ISGLs.

7. The method of claim 1, wherein the cache flush is performed on a RAID 5 or RAID 6 storage volume.

8. The method of claim 1, further comprising:
transferring the flush LMID to a RAID manager module; and
enabling the RAID manager module to read missing data into one or more RSGLs during execution of the cache flush.

9. A memory control system, comprising:
a host interface that receives one or more host Input/Output (I/O) commands;
a storage interface that enables communication with a plurality of storage devices configured in a storage array;
a microprocessor; and
memory that includes computer-readable instructions that are executable by the microprocessor, the instructions enabling performance of a cache flush and including:
instructions that allocate one or more Internal Scatter Gather Lists (ISGLs) for the cache flush;
instructions that populate the one or more ISGLs with Cache Segment Identifiers (CSIDs) and corresponding Buffer Segment Identifiers (BSIDs) of each strip that is identified as dirty, of a skip-type Internal Scatter Gather Element (ISGE), or of a missing arm-type ISGE;
instructions that allocate a flush Local Message Identifier (LMID) as a message to be used in connection with processing the cache flush;
instructions that populate the flush LMID with an identifier of the one or more ISGLs; and
instructions that transfer the flush LMID to a cache manager module to enable the cache manager module to execute the cache flush based on information contained in the flush LMID.

10. The system of claim 9, wherein the instructions further comprise:
instructions that allocate one or more RSGLs and one or more temporary buffers to read missing data and/or old data in connection with executing the cache flush; and
instructions that populate the allocated one or more RSGLs and one or more temporary buffers into the one or more ISGLs so that a single write can be issued.

11. The system of claim 10, wherein the instructions further comprise:
instructions that perform an XOR operation and generating one or more parity bits as a result of performing the XOR operation; and
instructions that enable the single write step to be issued after the XOR operation instead of multiple write steps.

12. The system of claim 10, wherein the instructions further comprise:
instructions that segregate the one or more temporary buffers into a first set of buffers and a second set of buffers;
instructions that utilize the first set of buffers for inner filler buffers; and
instructions that utilize the second set of buffers for outer filler buffers.

13. The system of claim 12, wherein the inner filler buffers are allocated from a different buffer pool than the outer filler buffers.

14. The system of claim 9, wherein the instructions further comprise:
instructions that free up one or more temporary buffers that are not required for the cache flush; and
instructions that enable the freed one or more temporary buffers to be used for parallel read or write commands that utilize a strip or row assigned to the one or more ISGLs.

15. The system of claim 9, wherein the cache flush is performed on a RAID 5 or RAID 6 storage volume.

16. The system of claim 9, wherein the instructions further comprise:
instructions that transfer the flush LMID to a RAID manager module; and
instructions that enable the RAID manager module to read missing data into one or more RSGLs during execution of the cache flush.

17. A cache system, comprising:
buffer memory; and
instructions that enable management of the buffer memory to facilitate a cache update operation to be performed, the instructions including:
instructions that remove a cache segment or row from a dirty list or tree;
instructions that allocate a flush Local Message Identifier (LMID) as a message to be used in connection with performing the cache update;
instructions that allocate a data structure to hold a snapshot of cache data;
instructions that populate the flush LMID with an Internal Scatter Gather List (ISGL) ID and an ISGL index of an ISGL to be used for storing a dirty arm;
instructions that allocate one or more alias buffers to temporarily store information that is to be written to a storage device; and
instructions that cause data from the dirty arm to be written to the one or more alias buffers and then to the storage device.

18. The cache system of claim 17, wherein the instructions further include instructions that determine the dirty arm has been written to the storage device and then free up the one or more alias buffers thereafter.

19. The cache system of claim 17, wherein the one or more alias buffers are allocated using a read-modify-write (RMW) process.

20. The cache system of claim 17, wherein the one or more alias buffers are allocated using a read peers process.

* * * * *